US012597648B2

(12) United States Patent
Shaffer, II et al.

(10) Patent No.: US 12,597,648 B2
(45) Date of Patent: Apr. 7, 2026

(54) BATTERY ASSEMBLY, METHOD OF PREPARATION, AND THERMAL CONTROL THEREOF

(71) Applicant: ADVANCED BATTERY CONCEPTS, LLC, Clare, MI (US)

(72) Inventors: Edward O. Shaffer, II, Farwell, MI (US); Shaun Bruno, Corunna, MI (US); Michael Everett, Fallbrook, CA (US); Reed Shick, Midland, MI (US); Cody Joseph Chartier, Midland, MI (US); Brandon Whitman, Clare, MI (US); Thomas Fair, Clare, MI (US); Michael Harmon, Clare, MI (US)

(73) Assignee: ADVANCED BATTERY CONCEPTS, LLC, Clare, MI (US)

( * ) Notice: Subject to any disclaimer, the term of this patent is extended or adjusted under 35 U.S.C. 154(b) by 712 days.

(21) Appl. No.: 17/912,347

(22) PCT Filed: Mar. 16, 2021

(86) PCT No.: PCT/US2021/022618
§ 371 (c)(1),
(2) Date: Sep. 16, 2022

(87) PCT Pub. No.: WO2021/188583
PCT Pub. Date: Sep. 23, 2021

(65) Prior Publication Data
US 2023/0142076 A1 May 11, 2023

Related U.S. Application Data

(60) Provisional application No. 62/990,073, filed on Mar. 16, 2020.

(51) Int. Cl.
*H01M 10/44* (2006.01)

(52) U.S. Cl.
CPC ................................. *H01M 10/446* (2013.01)
(58) Field of Classification Search
CPC ...................................................... H01M 10/446
(Continued)

(56) References Cited

U.S. PATENT DOCUMENTS

| 414,953 | A | 11/1889 | Roberts |
| 1,712,897 | A | 5/1929 | Morrison |

(Continued)

FOREIGN PATENT DOCUMENTS

| CA | 2560069 A1 | 9/2005 |
| CH | 248315 A | 4/1947 |

(Continued)

OTHER PUBLICATIONS

International Search Report and Written Opinion, Application No. PCT/US2021/022618, dated Jul. 28, 2021.
(Continued)

*Primary Examiner* — Allison Bourke
*Assistant Examiner* — Robert Gene West
(74) *Attorney, Agent, or Firm* — The Dobrusin Law Firm, P.C.; Daniela M. Thompson-Walters

(57) ABSTRACT

The present disclosure relates to a bipolar battery comprising one or more troughs formed therein and cooperating with one or more channels, the troughs adapted to guide flow of electrolyte to provide for faster and more uniform flow of the electrolyte. The disclosure relates to a bipolar battery assembly comprising: a) a plurality of electrode plates stacked together to form an electrode plate stack; b) one or more electrochemical cells, wherein each electrochemical cell is formed between a pair of electrode plates; c) one or more separators disposed within the one or more electrochemical cells; and d) one or more troughs formed in each of the one or more electrochemical cells and adapted to
(Continued)

guide flow of electrolyte into the one or more electrochemical cells. The present disclosure further relates to a method for preparing a battery assembly. The method may utilize circulating one or more fluids through the battery assembly during preparation. Circulating fluids may be part of thermal control cycling.

20 Claims, 9 Drawing Sheets

(58) Field of Classification Search
USPC ........................................................ 29/623.2
See application file for complete search history.

(56) References Cited

U.S. PATENT DOCUMENTS

| | | | |
|---|---|---|---|
| 3,522,104 A | 7/1970 | Biddick | |
| 4,008,099 A | 2/1977 | Lindstrom | |
| 4,098,967 A | 7/1978 | Biddick | |
| 4,510,219 A | 4/1985 | Rowlette | |
| 4,542,082 A | 9/1985 | Rowlette | |
| 4,625,395 A | 12/1986 | Rowlette | |
| 4,637,970 A | 1/1987 | Yeh | |
| 4,658,499 A | 4/1987 | Rowlette | |
| 4,752,545 A | 6/1988 | Brecht | |
| 4,861,686 A | 8/1989 | Snyder | |
| 4,900,643 A | 2/1990 | Eskra | |
| 5,002,841 A | 3/1991 | Belongia | |
| 5,035,045 A | 7/1991 | Bowen | |
| 5,068,160 A * | 11/1991 | Clough ............... H01M 50/682 |
| | | | 429/154 |
| 5,114,807 A | 5/1992 | Rowlette | |
| 5,143,806 A | 9/1992 | Bullock | |
| 5,288,565 A | 2/1994 | Gruenstern | |
| 5,308,717 A | 5/1994 | Gordin | |
| 5,308,718 A | 5/1994 | Eidler et al. | |
| 5,326,656 A | 7/1994 | Meadows | |
| 5,379,502 A | 1/1995 | Feldstein | |
| 5,385,793 A | 1/1995 | Tiedemann | |
| 5,393,617 A | 2/1995 | Klein | |
| 5,429,643 A | 7/1995 | Lund et al. | |
| 5,441,824 A | 8/1995 | Rippel | |
| 5,470,679 A | 11/1995 | Lund et al. | |
| 5,510,211 A | 4/1996 | Sundberg | |
| 5,582,937 A | 12/1996 | LaFollette | |
| 5,585,209 A | 12/1996 | Feldstein | |
| 5,593,797 A | 1/1997 | Brecht | |
| 5,682,671 A | 11/1997 | Lund | |
| 5,688,615 A | 11/1997 | Mrotek | |
| 5,800,946 A | 9/1998 | Grosvenor | |
| 5,916,709 A | 6/1999 | Arias | |
| 6,017,653 A | 1/2000 | Petrakovich | |
| 6,077,623 A | 6/2000 | Grosvenor | |
| 6,139,987 A | 10/2000 | Koo et al. | |
| 6,159,633 A | 12/2000 | Yang | |
| 6,174,337 B1 | 1/2001 | Keenan | |
| 6,255,015 B1 | 7/2001 | Corrigan et al. | |
| 6,280,879 B1 | 8/2001 | Andersen | |
| 6,555,267 B1 | 4/2003 | Broman | |
| 6,589,298 B1 | 7/2003 | Limoges et al. | |
| 6,889,410 B2 | 5/2005 | Shivashankar et al. | |
| 7,275,130 B2 | 9/2007 | Klein | |
| 8,357,469 B2 | 1/2013 | Shaffer, II et al. | |
| 9,166,231 B2 | 10/2015 | Hoshiba | |
| 9,379,378 B2 | 6/2016 | Ross | |
| 9,531,031 B2 | 12/2016 | Shaffer, II | |
| 9,553,329 B2 | 1/2017 | Shaffer, II et al. | |
| 9,666,860 B2 | 5/2017 | Lam | |
| 9,685,677 B2 | 6/2017 | Shaffer, II | |
| 9,825,336 B2 | 11/2017 | Shaffer, II et al. | |
| 10,141,598 B2 | 11/2018 | Shaffer, II et al. | |
| 10,615,393 B2 | 4/2020 | Shaffer, II | |
| 2002/0008041 A1 * | 1/2002 | Fairbourn ................. C23F 1/04 |
| | | | 205/705 |

| | | | |
|---|---|---|---|
| 2004/0067417 A1 | 4/2004 | Oosawa et al. | |
| 2004/0072074 A1 | 4/2004 | Partington | |
| 2006/0003223 A1 | 1/2006 | Willson | |
| 2006/0263692 A1 | 11/2006 | Kelley | |
| 2006/0269801 A1 | 11/2006 | Honbo et al. | |
| 2006/0292443 A1 | 12/2006 | Ogg | |
| 2007/0148542 A1 | 6/2007 | Szymborski | |
| 2007/0212604 A1 | 9/2007 | Ovshinsky | |
| 2009/0042099 A1 | 2/2009 | Tatematsu et al. | |
| 2009/0098457 A1 | 4/2009 | Kwon | |
| 2009/0248124 A1 | 10/2009 | Pianca | |
| 2010/0183920 A1 | 7/2010 | Brecht | |
| 2011/0014520 A1 | 1/2011 | Ueda | |
| 2011/0091770 A1 | 4/2011 | Han et al. | |
| 2011/0183166 A1 | 7/2011 | Suga et al. | |
| 2011/0183203 A1 | 7/2011 | Du et al. | |
| 2012/0077063 A1 * | 3/2012 | Schuetzbach ....... H01M 10/058 |
| | | | 429/81 |
| 2012/0125786 A1 * | 5/2012 | Clasquin ................... C25F 3/16 |
| | | | 205/684 |
| 2012/0244429 A1 | 9/2012 | Lam | |
| 2013/0065105 A1 | 3/2013 | Faust | |
| 2013/0115505 A1 | 5/2013 | Xie | |
| 2014/0087237 A1 | 3/2014 | Dhar et al. | |
| 2014/0349147 A1 | 11/2014 | Shaffer, II et al. | |
| 2015/0132668 A1 | 5/2015 | Oi | |
| 2015/0140376 A1 | 5/2015 | Shaffer, II et al. | |
| 2015/0280209 A1 * | 10/2015 | Ohara ..................... H01M 4/13 |
| | | | 429/94 |
| 2016/0036109 A1 | 2/2016 | Kim et al. | |
| 2016/0111755 A1 | 4/2016 | Liu | |
| 2016/0197373 A1 * | 7/2016 | Shaffer ............... H01M 50/463 |
| | | | 429/210 |
| 2016/0380259 A1 | 12/2016 | Yang | |
| 2017/0077545 A1 | 3/2017 | Shaffer, II | |
| 2017/0244134 A1 | 8/2017 | Shaffer, II | |
| 2017/0317351 A1 * | 11/2017 | Prengaman .......... H01M 4/662 |
| 2017/0373298 A1 | 12/2017 | Kitoh et al. | |
| 2018/0053926 A1 | 2/2018 | Shaffer, II et al. | |
| 2018/0375145 A1 | 12/2018 | Ochiai | |
| 2019/0379036 A1 | 12/2019 | Cadena | |
| 2020/0091521 A1 | 3/2020 | Shaffer, II | |
| 2021/0020943 A1 * | 1/2021 | Hartwig ................ H01M 8/188 |
| 2022/0384775 A1 * | 12/2022 | Lee ........................ H01M 4/386 |

FOREIGN PATENT DOCUMENTS

| | | | | |
|---|---|---|---|---|
| CN | 1220289 C | 9/2005 | | |
| CN | 101202356 A | 6/2008 | | |
| CN | 101379652 A | 3/2009 | | |
| CN | 104538568 B | 4/2015 | | |
| CN | 110622342 A * | 12/2019 | .......... H01M 10/052 |
| CN | 110783654 A * | 2/2020 | ............ H01M 10/12 |
| DE | 2160868 A1 | 6/1973 | | |
| DE | 3822462 C1 | 11/1989 | | |
| DE | 19608326 A1 | 9/1997 | | |
| DE | 10058381 A1 | 6/2002 | | |
| DE | 102004018619 A1 | 11/2005 | | |
| EP | 0177225 A1 | 11/1988 | | |
| EP | 0402265 B1 | 3/1995 | | |
| EP | 0631338 A | 4/2000 | | |
| EP | 1329973 A1 | 7/2003 | | |
| EP | 1418638 A2 | 5/2004 | | |
| EP | 1419549 A1 | 5/2004 | | |
| EP | 1478035 A2 | 11/2004 | | |
| EP | 1986250 A1 | 10/2008 | | |
| EP | 2017918 A1 | 1/2009 | | |
| EP | 2273580 A2 | 1/2011 | | |
| EP | 2405524 A1 | 1/2012 | | |
| EP | 2471129 B1 | 7/2012 | | |
| EP | 2645450 A1 | 10/2013 | | |
| EP | 2696395 A1 | 2/2014 | | |
| EP | 3016182 A1 | 5/2016 | | |
| EP | 3196964 A1 | 7/2017 | | |
| EP | 3316353 A1 | 5/2018 | | |
| EP | 3480867 A1 | 5/2019 | | |
| FR | 55043 E | 6/1951 | | |
| GB | 1532712 A | 11/1978 | | |

(56) References Cited

FOREIGN PATENT DOCUMENTS

| | | | |
|---|---|---|---|
| JP | S47-056454 | | 5/1947 |
| JP | S51-069142 | A | 6/1976 |
| JP | 55-024321 | | 2/1980 |
| JP | S59-121787 | A | 7/1984 |
| JP | S59-138076 | A | 8/1984 |
| JP | S59-146171 | A | 8/1984 |
| JP | S59196560 | A | 11/1984 |
| JP | S60189867 | A | 9/1985 |
| JP | H01-143161 | A | 6/1989 |
| JP | H06314567 | A | 11/1994 |
| JP | 07073871 | A | 3/1995 |
| JP | H07-057768 | A | 3/1995 |
| JP | H09-045363 | A | 2/1997 |
| JP | 10223211 | A | 8/1998 |
| JP | 10247491 | A | 9/1998 |
| JP | 2000-243403 | A | 9/2000 |
| JP | 2000-340265 | A | 12/2000 |
| JP | 2000-357532 | A | 12/2000 |
| JP | 2003-522372 | A | 7/2003 |
| JP | 2003-249259 | A | 9/2003 |
| JP | 2004-095402 | A | 3/2004 |
| JP | 2004-158343 | A | 6/2004 |
| JP | 2005-032642 | A | 2/2005 |
| JP | 2005-056761 | A | 3/2005 |
| JP | 2005-064208 | A | 3/2005 |
| JP | 2005-259379 | A | 9/2005 |
| JP | 2007-012596 | | 1/2007 |
| JP | 2007-242593 | A | 9/2007 |
| JP | 2009-164146 | A | 7/2009 |
| JP | 2009-252548 | A | 10/2009 |
| JP | 2010-251159 | A | 11/2010 |
| JP | 2010-277862 | A | 12/2010 |
| JP | 2011-009039 | A | 1/2011 |
| JP | 2012-234823 | A | 11/2012 |
| JP | 2013-541157 | A | 11/2013 |
| JP | 2014-199801 | A | 10/2014 |
| JP | 2014-534582 | A | 12/2014 |
| JP | 5333576 | B2 | 11/2016 |
| JP | 2019-087414 | A | 6/2019 |
| KR | 10-0194913 | | 6/1999 |
| KR | 10-2001-0072859 | A | 7/2001 |
| KR | 10-2001-0097437 | | 11/2001 |
| KR | 10-2003-0059930 | | 7/2003 |
| KR | 10-2005-0020036 | | 6/2005 |
| KR | 10-2010-0033831 | A | 3/2010 |
| KR | 10-2015-0013272 | A | 2/2015 |
| KR | 10-2019-0050928 | A | 5/2019 |
| KR | 1020200009045 | A | 1/2020 |
| RU | 2030034 | C1 | 2/1995 |
| WO | 1993/001624 | A1 | 1/1993 |
| WO | 1994/007272 | A1 | 3/1994 |
| WO | 1994/029911 | A1 | 12/1994 |
| WO | 1999/063611 | A1 | 12/1999 |
| WO | 2001/003224 | A1 | 1/2001 |
| WO | 2003/007415 | A1 | 1/2003 |
| WO | 2003/085751 | A2 | 10/2003 |
| WO | 2005022674 | A1 | 3/2005 |
| WO | 2006/105187 | A1 | 10/2006 |
| WO | 2007/132621 | A1 | 11/2007 |
| WO | 2010/085474 | A1 | 7/2010 |
| WO | 2010/100979 | A1 | 9/2010 |
| WO | 2011/109683 | A1 | 9/2011 |
| WO | 2013/062623 | A1 | 4/2012 |
| WO | 2017/136545 | A1 | 8/2017 |
| WO | 2018/111962 | | 6/2018 |
| WO | 2018/115836 | A1 | 6/2018 |
| WO | 2018/213730 | A2 | 11/2018 |
| WO | 2018/237381 | A | 12/2018 |
| WO | 2020/102677 | A1 | 5/2020 |
| WO | 2020/243093 | A1 | 12/2020 |
| WO | 2021/188583 | A1 | 9/2021 |

OTHER PUBLICATIONS

International Preliminary Report on Patentability, Application No. PCT/US2021/022618, dated Jul. 14, 2022.

Japanese Office Action mailed Jun. 6, 2024, Application No. 2022-555751.

KR Preliminary Rejection dated Oct. 25, 2024, Application No. 10-2022-7035457 and Translation.

* cited by examiner

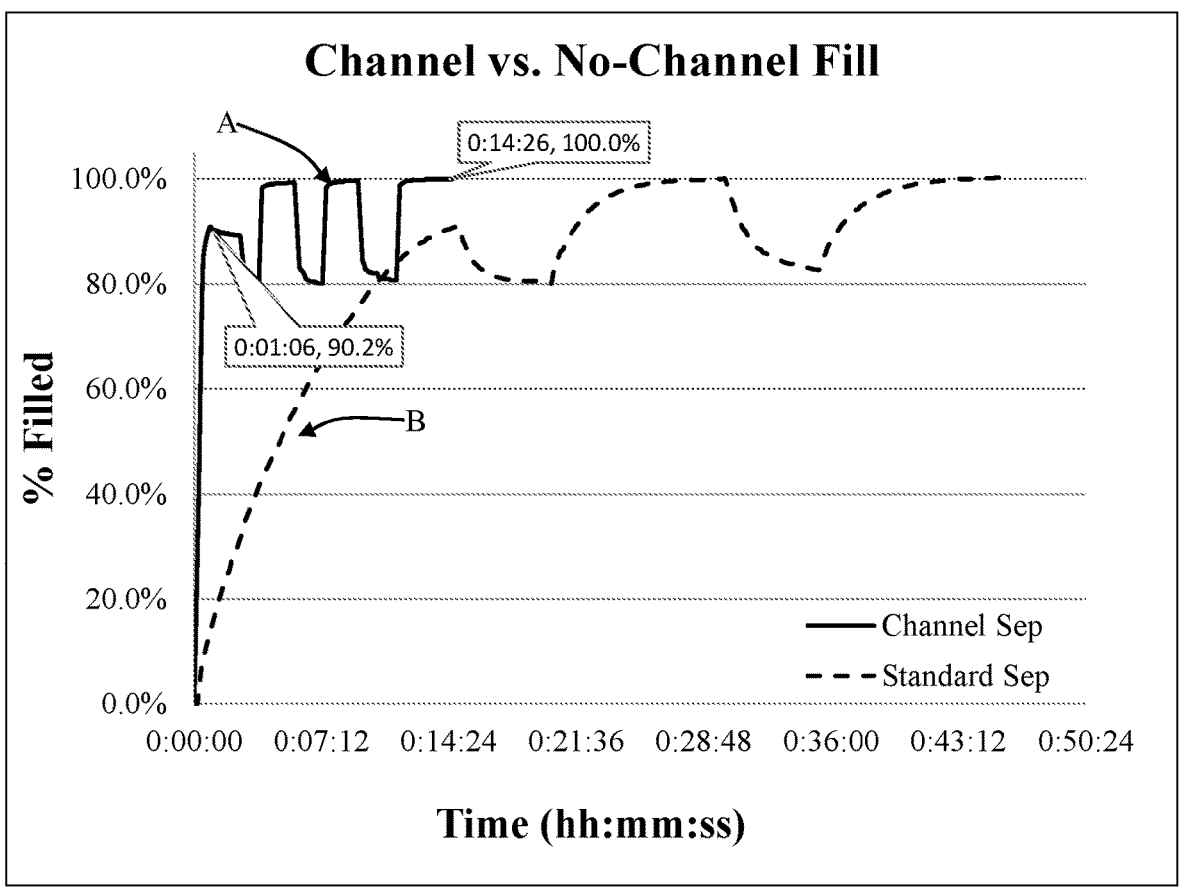
_FIG.-12_

BATTERY ASSEMBLY, METHOD OF PREPARATION, AND THERMAL CONTROL THEREOF

CROSS REFERENCE TO RELATED APPLICATIONS

Applicant claims the benefit of U.S. Provisional Application No. 62/990,073, filed on Mar. 16, 2020, the contents of which are incorporated herein by reference in its entirety.

FIELD

The present disclosure relates generally to a bipolar battery assembly and more specifically to one or more troughs within the battery assembly. The present disclosure may find particular use in temperature control of a bipolar battery from within an interior during pickling, formation, charging, discharging, or even during operation.

BACKGROUND

Traditionally, bipolar battery assemblies, such as that taught in US Publication No. US 2009/0042099, incorporated herein by reference, include an electrolyte within a stack of electrode plates. The electrolyte allows electrons and ions to flow between the cathode and anode material of the electrode plates. The bipolar battery assemblies are held together by bolts which pass through aligned through-holes in the electrode plates and separators. To provide an electrolyte which does not leak from the electrode stack or into channels of the stack, a solid electrolyte is generally used to reduce the need for separate sealing members within the battery assembly instead of a liquid electrolyte. Solid electrolyte or semi-solid electrolyte may be part of sealed lead acid (SLA) battery assemblies. An exemplary SLA battery assembly is a gel battery where the electrolyte solution formed is a jelly-like solution which dries out to be a solid electrolyte. These solid or semi-solid electrolyte-based battery assemblies while generally effective at addressing leakage concerns can be costly to manufacture, may be more easily damaged when overcharged, and even have shorter lifespans (three to five years for SLA batteries versus up to 20 years for wet-cell batteries). An elegant solution of providing integrated seals via alignment and interlocking of channels and frames provides a means of using liquid electrolyte while overcoming some of these solutions. Suitable integrated seals are disclosed in PCT Publication WO2013/062623 and U.S. Pat. No. 10,141,598, incorporated herein by reference in their entirety for all purposes.

In addition to the risk of leaking, a challenge presented by liquid electrolyte can be the time duration of the pickling (also known as "soaking") process. The pickling process typically involves filling the electrochemical cells of the battery assembly with the liquid electrolyte and allowing for the electrolyte to soak into the active material of the electrode plates. This can be a time-consuming part of the battery assembly process which can limit mass commercialization capacity. Generally, during the pickling process, the electrolyte wicks through the pores or paths of the separator to fill the electrochemical cell and be absorbed by the active material adjacent to each side of the separator, such as that taught in PCT Publication WO2013/062623.

Not only does pickling add time challenges but curing and drying may also present challenges with overall time to assemble the battery, overall facility space required for equipment, and requiring multiple workstations for assembly, curing, drying, pickling, and formation prior to charging for operation. Curing and drying of active materials applied onto one or more electrode plates is generally done with the aid of a curing oven. Thus, electrode plates prepared with active material thereon on in paste form may transition from an assembly area for applying the active material to a curing area having a curing oven before being able to undergo stacking into an electrode plate stack, pickling, formation, or charging. One such pasting process is disclosed in PCT Publication WO2018/213730, incorporated herein by reference in its entirety for all purposes.

Another challenge presented by typical bipolar battery assemblies is that the battery may produce excess heat when pickling, formation, charging or discharging. The pickling process is usually an exothermic process causing the internal battery temperature to become elevated. Generally, after pickling, the battery assembly goes through a forming process. To start the formation process, the battery assembly is attached to an electrical supply to charge. The formation process, while endothermic, generates more acid. This generated acid generally continues the pickling process, causing subsequent exothermic reactions. So, although formation is endothermic, and absorbs heat, typically the resulting exothermic reaction generates an equivalent amount or even more heat than is absorbed, causing the internal temperature of the battery assembly to remain elevated or even further increase. Excess heat may also occur as a result of power dissipation as current flows through the internal resistance of the battery during charging or discharging (also known as Joule heating). Excess heat may also occur from exothermic reactions within the electrochemical cells during charging or discharging. Excessive generated heat in a battery assembly can result in a number of issues, including: active chemicals may expand causing the electrochemical cells to swell, pressure may build up inside the electrochemical cells, increased swelling and pressure may cause mechanical distortion of components (such as outward deformation, e.g., bulging), mechanical distortion may result in short circuiting as components move away from one another and create leak paths or contact is lost, cracking of components may occur due to prolonged operation at excessively high temperatures, thermal runaway during chemical reactions, gasses are given off, and/or one or more cells may rupture or explode due to the increased temperatures. Due to these potential issues, the rate at which a battery assembly is able to be pickled, formed, charged, or discharged is thus dependent on the rate at which excess generated heat is able to be removed. Another challenge presented by bipolar battery assemblies is their ability to be charged at cold or hot temperatures. In low temperatures (such as below 5° C.), some batteries may build up pressure within cells leading to venting. Poor charge acceptance in cold temperatures may mimic a fully charged battery due to the pressure build up.

Today there are a number of different processes utilized for controlling the temperature of a battery during formation, pickling, charging, and discharging and maintaining the battery assembly below a threshold temperature. To control the heat generated during pickling and formation and maintain the battery assembly beneath a threshold temperature, chilled electrolyte may be used for an initial fill to result in an overall lower internal temperature of the battery assembly after the exothermic reactions occur. The battery assembly may be submerged within a temperature-controlled (e.g., chilled) water bath during formation to provide for heat removal. The rate of heat removal often controls, and thus constrains, the rate of pickling and formation, as the internal temperature of the battery assembly must be maintained below the threshold. In addition to the excess processing time (i.e., increased lead time), these additional processes lead to additional costs in the inventory of work-in-progress (i.e., batteries being assembled), equipment for cooling and heating, storage space, electricity used for charging, and labor for assembling.

What is needed is a battery assembly compatible with a liquid electrolyte while maintaining a seal about the electrochemical cells and one or more channels extending through the assembly. What is needed is a battery assembly which is able to more quickly receive the electrolyte into the electrochemical cells and allow the electrolyte to soak into the active material. What is needed is an electrode plate and/or battery assembly which can cure and dry without the use of a curing oven. What is needed is a battery assembly which is able to be temperature controlled from within an interior. What is needed is a battery assembly which is able to have its temperature controlled to allow for faster pickling, formation, charging, and/or discharging.

SUMMARY

The present teachings generally relate to troughs suitable for incorporating into a battery assembly. The troughs may aid in dispersing of one or more fluids into the electrochemical cells, helping distribute fluids away from the channels and into the cells. The troughs may also be useful in the reverse, collecting fluids from the cells and guiding into the channels. The troughs may be advantageous during steps of the battery assembly preparation process, including during curing, evacuation, filling, pickling, forming, drying, and the like. The troughs may even aid in thermal control cycling for flowing one or more fluids through the battery assembly.

The disclosure relates to a bipolar battery assembly comprising: a) a plurality of electrode plates stacked together to form an electrode plate stack; b) one or more electrochemical cells, wherein each electrochemical cell is formed between a pair of electrode plates; c) one or more separators disposed within the one or more electrochemical cells; and d) one or more troughs formed in each of the one or more electrochemical cells and adapted to guide flow of electrolyte into the one or more electrochemical cells.

The present disclosure relates to a separator for a bipolar battery comprising: a) one or more sheets which is porous and non-conductive, and configured to allow electrolyte, ions, electrons, or a combination thereof therethrough; b) one or more openings in the sheet adapted to align with one or more other openings of adjacent electrode plates to form one or more channels; and c) one or more troughs formed in the sheet as one or more channels of reduced thickness of the sheet and adapted to guide flow of electrolyte of the bipolar battery.

The present disclosure relates to a bipolar battery assembly comprising: a) a plurality of electrode plates stacked together forming one or more electrochemical cells therebetween; b) one or more separators having one or more troughs formed therein, wherein the one or more separators are located between the one or more electrochemical cells; and c) an electrolyte located in the one or more electrochemical cells.

The present teachings generally relate to methods of preparing a battery assembly. Preparing a battery assembly may include steps such as assembling, curing, evacuating, filling, pickling, forming, drying, thermal control cycling, the like, or a combination thereof. Some of these steps may be completed sequentially, simultaneously, or both. For example, thermal control cycling may occur during curing, pickling, forming, drying, the like, or a combination thereof. As an example, thermal control cycling may include evacuating, filling, or both. Thermal control cycling may include flowing one or more fluids through the battery assembly (e.g., fluid circulation, circulating one or more fluids). These fluids may flow through one or more electrochemical cells, channels, troughs, ports, vents, valves, holes, openings, the like, or a combination thereof. These fluids may be circulated through the battery assembly. Fluid circulation may include flowing the same fluid in and out, or vice-versa, of the battery assembly. Fluid circulation may include removing one fluid and filling with another fluid. Thermal control cycling may be advantageous in introducing fluids into the battery assembly having a different temperature than an interior of the battery assembly. This temperature difference may allow for one or more steps of preparing a battery assembly to occur more quickly, be more cost effect, remain assembled (e.g., stacked), the like, or a combination thereof.

Preparing a battery assembly may include or be free of using the one or more troughs as described herein. Use of the one or more troughs, in addition to the channels, may even further increase the benefits of the battery preparation processes disclosed herein, such as thermal control cycling.

The present disclosure relates to a method for preparing a battery assembly comprising: a) filling a battery assembly with a liquid electrolyte having one or more reactants therein; b) forming the battery assembly by applying an electric charge; and thermal control cycling to maintain an internal temperature of the battery assembly below a threshold temperature.

The present disclosure relates to a method for preparing a battery assembly comprising: a) filling a battery assembly with a liquid electrolyte having one or more reactants therein; b) optionally, pickling the battery assembly; c) forming the battery assembly by applying an electric charge; and d) thermal control cycling to maintain an internal temperature of the battery assembly below a threshold temperature.

The present disclosure relates to a method for preparing a battery assembly in a single workstation comprising: a) providing a formed battery stack with a plurality of electrochemical cells at the single workstation; b) optionally, pickling the battery assembly while flowing one or more pickling fluids through the battery assembly; and c) forming the battery assembly by applying an electric charge and while flowing one or more forming fluids through the battery assembly.

The present teachings provide for a battery assembly having one or more channels passing therethrough. One or more of the channels may include one or more fill channels, suitable for distributing electrolyte to the electrochemical cells. The one or more fill channels may be in communication with one or more troughs. The one or more troughs may include a plurality of troughs distributed about each electrochemical cell. The one or more troughs may guide the flow of electrolyte such that the electrolyte wicks through the separator in a faster and more uniform flow. One or more fill channels may also be used for evacuation of the electrolyte. Evacuation may be complete or partial during a thermal control cycling process. The thermal control cycling process may be advantageous in allowing for a cooler electrolyte to replace a warmed electrolyte, and thus providing a means of heat removal and an internal heat sink. The one or more channels and troughs may provide a more efficient means of curing the battery assembly while avoiding a curing oven. One or more fluids, such as air at an elevated temperature, may be circulated through the one or more channels and troughs to cure active material of the battery assembly.

BRIEF DESCRIPTION OF DRAWINGS

FIG. 10 illustrates a cross-section of a battery assembly exposing a separator having troughs and an electrolyte flowing through the separator.

FIG. 11 illustrates a cross-section of a battery assembly exposing a separator having an electrolyte flowing through.

FIG. 12 is a line graph illustrating comparisons of the duration to fill a battery assembly with electrolyte.

DETAILED DESCRIPTION

Figures 1, 2, 3:
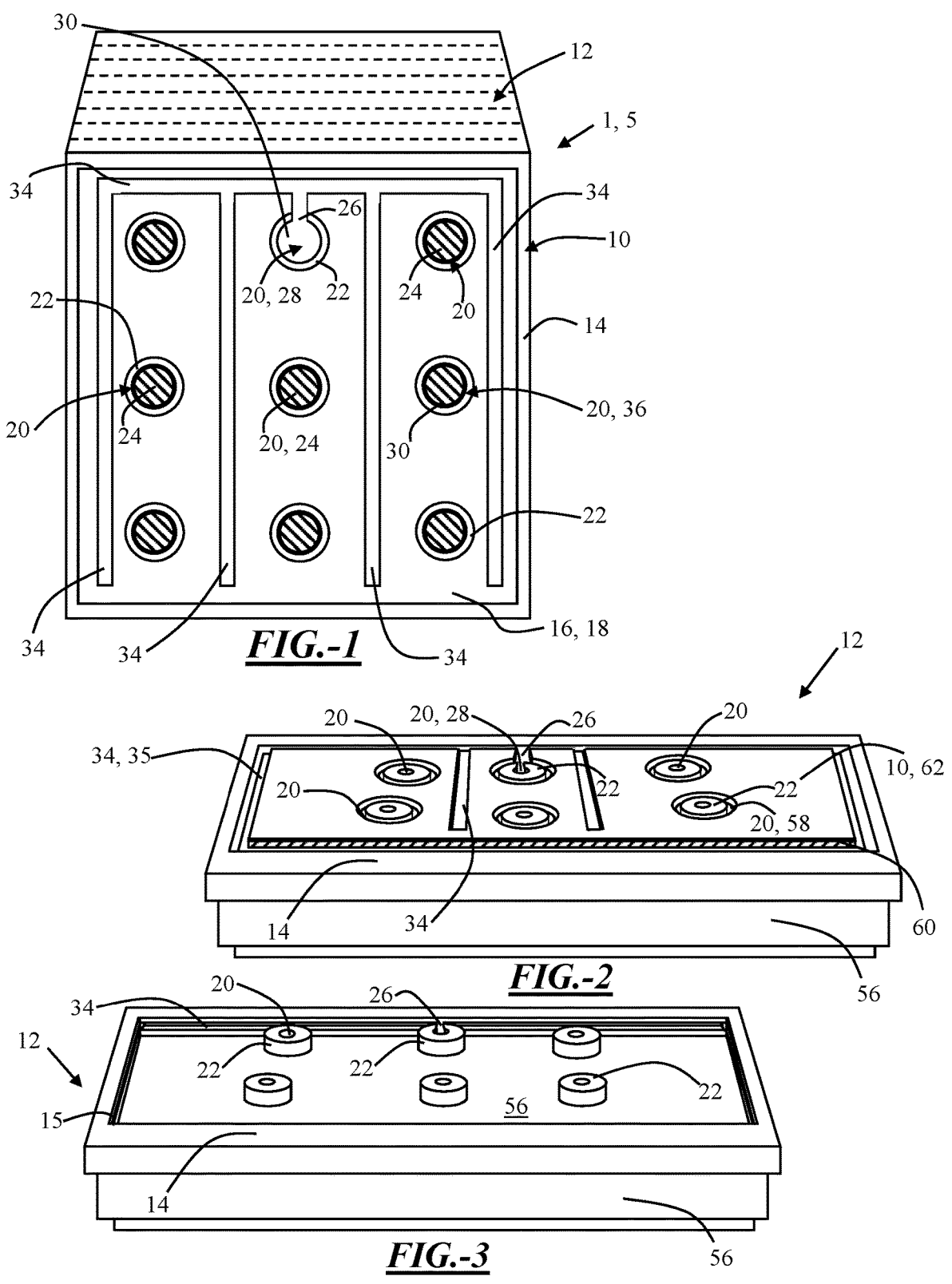
FIG. 1 illustrates a cross-section of a battery assembly exposing a separator.
FIG. 2 is a perspective view of an electrode plate.
FIG. 3 is a perspective view of an electrode plate.

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Battery Assembly

The battery assembly of the disclosure generally relates to a battery assembly and may find particular use as a bipolar battery assembly. The bipolar battery assembly may be a lead acid battery. The bipolar battery assembly may be a valve regulated lead acid battery (VRLA). The battery assembly includes one or more stacks of a plurality of electrode plates. The plurality of electrode plates may include one or more bipolar plates, monopolar plates, dual polar plates, end plates, or any combination thereof. The one or more bipolar plates include a substrate having an anode on one surface and a cathode on an opposing surface. A monopolar plate may include either an anode or a cathode deposited on a surface. First and second monopolar plates may be located at opposing ends of the one or more stacks having the bipolar plates, dual polar plates, or both located therebetween. The battery assembly may include one or more end plates, such as a first end plate and a second plate. The one or more end plates are attached at one or more ends of the stack. The one or more end plates may be the one or more monopolar plates or separate from the monopolar plates. For example, a first end plate may be attached at an opposing end of the stack as a second end plate. The one or more end plates may be particularly useful for reinforcing one or more electrode plates during drawing of a vacuum within the battery assembly, filling of the battery assembly, during operation in a charge and/or discharge cycle of the battery assembly, or any combination thereof. The stack includes a separator and an electrolyte located between each adjacent pair of the electrode plates. Each pair of adjacent electrode plates (including the anode and cathode thereon) with the separator and electrolyte therebetween may form an electrochemical cell. One or more electrochemical cells may include one or more troughs therein. The troughs may be located within or in direct fluid communication with an active region of each electrochemical cell. The one or more troughs may aid in expediting the disbursement (e.g., wicking, flow) of an electrolyte within each electrochemical cell. The battery assembly may include one or more channels. The one or more channels may pass transversely through one or more electrode plates, electrolyte, separators, an active region, or a combination thereof. The one or more channels may be referred to as transverse channels. One or more channels may be transverse to, in fluid communication with, or both one or more troughs. The one or more channels may be formed by openings, inserts, or both. The one or more openings, inserts, or both may be part of (e.g., attached, integral) the one or more electrode plates, separators, or both. The one or more channels may pass through active regions of each electrochemical cell. The one or more channels may be sealed from a liquid electrolyte through which it passed. One or more fluids may circulate through the one or more channels, troughs, or both. The one or more fluids may aid in more quickly disbursing electrolyte; controlling temperature of the battery assembly during pickling, forming, charging, and/or discharging; or any combination thereof.

The battery assembly may include one or more end plates. The one or more end plates may function to reinforce one or more electrode plates, resist or prevent both outward and inward deformation of one or more electrode plates due to pressure differentials within a battery assembly compared to the external environment, prevent semi-permanent or permanent damage to one or more electrode plates, ensure interlocked components which create a seal remain sealed, or any combination thereof. The one or more end plates may have any size, shape, and/or configuration to reinforce one or more electrode plates, resist or prevent both outward and inward deformation of one or more electrode plates due to pressure differentials within a battery assembly compared to the external environment, prevent semi-permanent or permanent damage to one or more electrode plates, ensure interlocked components which create a seal remain sealed, or any combination thereof. The one or more end plates may or may not be an electrode plate. One or more end plates may be one or more monopolar plates. For example, at opposing ends of the stack of electrode plates, each monopolar plate may be an end plate. The one or more end plates may be adjacent to one or more electrode plates. For example, at opposing ends of the stack of electrode plates which include opposing monopolar plates, an end plate may be affixed to each monopolar plate. The one or more end plates may be attached to one or more electrode plates at opposing ends of a stack. For example, a stack may include a first end plate at an opposing end of the stack as a second end plate. The one or more end plates may be sufficiently rigid to resist outward bulging created by temperatures and pressures within a battery assembly during operation, resist inward bending during pulling of a vacuum inside of the battery assembly, or both. The end plate may include a base, an internal reinforcement structure, one or more openings, one or more raised inserts, one or more attachment mechanisms, or any combination thereof. Teachings related to end plates as or separate from electrode plates and including internal reinforcement structures can be found in U.S. Pat. No. 10,141,598.

A battery assembly may include one or more electrochemical cells. An electrochemical cell may also be referred to as a cell. Each electrochemical cell may be formed between a pair of electrode plates. An electrochemical cell may be formed by a pair of opposing electrode plates with an opposing anode and cathode pair therebetween. The space of an electrochemical cell (i.e., between an opposing anode and cathode pair) may contain one or more separators, transfer sheets, electrolyte, or a combination thereof. One or more electrochemical cells may be sealed. The electrochemical cells may be sealed through one or more seals formed about the periphery of the electrode plate stack, such as by a membrane and/or interlocking of frames, one or more channels, or a combination thereof which may form closed electrochemical cells. The closed electrochemical cells may be sealed from the environment to prevent leakage and short circuiting of the cells.

The battery assembly may include a plurality of electrode plates. An electrode plate may function as one or more electrodes, include one or more electroactive materials, be part of an electrochemical cell, form part of one or more sealing structures, or any combination thereof. A plurality of electrode plates may function to conduct an electric current (i.e., flow of ions and electrons) within the battery assembly. A plurality of electrode plates may form one or more electrochemical cells. For example, a pair of electrode plates, which may have a separator and/or electrolyte therebetween, may form an electrochemical cell. The number of electrode plates present can be chosen to provide the desired voltage of the battery. The battery assembly design provides flexibility in the voltage that can be produced. The plurality of electrode plates can have any desired cross-sectional shape and the cross-sectional shape can be designed to fit the packaging space available in the use environment. Cross-sectional shape may refer to the shape of the plates from the perspective of the faces of the sheets. Flexible cross-sectional shapes and sizes allow preparation of the assemblies disclosed to accommodate the voltage and size needs of the system in which the batteries are utilized. Opposing end plates and/or monopolar plates may sandwich a plurality of electrode plates therebetween. The plurality of electrode plates may include one or more bipolar plates, monopolar plates, dual polar plates, the like, or any combination thereof. Suitable electrode plates are disclosed in PCT Publications WO 2013/062623, WO 2018/213730, WO 2018/237381, and WO 2020/102677; U.S. Pat. Nos. 8,357,469; 10,141,598, 10,615,393; and US Patent Publication No.: 2019/03790361 incorporated herein by reference in their entirety for all purposes.

A plurality of electrode plates stacked together may form an electrode plate stack. An electrode plate stack may simply be referred to as a stack or a stack of electrode plates. An electrode plate stack may generally comprise a plurality of bipolar electrode plates between opposing monopolar plates. An electrode plate stack may include one or more dual polar plates located between a plurality of bipolar electrode plates. An electrode plate stack may include separators, transfer sheets, or both located in between adjacent electrode plates (e.g., within the electrochemical cells). An electrode plate stack may or may not include electrolyte. An electrode plate stack may refer to the battery assembly before being operational, the stack of components of a battery assembly, the assembly while pickling, the assembly while forming, the assembly after stacking electrode plates, the assembly once separators are located between adjacent electrode plates, or any combination thereof.

One or more electrode plates may include one or more substrates. One or more substrates may function to provide structural support for the cathode and/or the anode; as a cell partition so as to prevent the flow of electrolyte between adjacent electrochemical cells; cooperating with other battery components to form an electrolyte-tight seal about the bipolar plate edges which may be on the outside surface of the battery; and in some embodiments to transmit electrons from one surface to the other. The substrate can be formed from a variety of materials depending on the function or the battery chemistry. The substrate may be formed from materials that are sufficiently structurally robust to provide the backbone of a desired bipolar electrode plate, withstanding temperatures that exceed the melting points of any conductive materials used in the battery construction, and having high chemical stability during contact with an electrolyte (e.g., sulfuric acid solution) so that the substrate does not degrade upon contact with an electrolyte. The substrate may be formed from suitable materials and/or is configured in a manner that permits the transmission of electricity from one surface of the substrate to an opposite substrate surface. The substrate may be formed from one or more electrically conductive materials, electrically non-conductive materials, or both. A substrate formed of one or more electrically non-conductive materials may include one or more electrically conductive features constructed therein or thereon. One or more electrically conductive materials may include one or more metallic materials. One or more electrically non-conductive materials may include polymeric materials; such as thermoset polymers, elastomeric polymers, thermoplastic polymers, or any combination thereof. One or more of polymeric materials that may be employed include polyamide, polyester, polystyrene, polyethylene (including polyethylene terephthalate, high density polyethylene and low-density polyethylene), polycarbonates (PC), polypropylene, polyvinyl chloride, bio-based plastics/biopolymers (e.g., polylactic acid), silicone, acrylonitrile butadiene styrene (ABS), or any combination thereof, such as PC/ABS (blends of polycarbonates and acrylonitrile butadiene styrenes). The substrate may comprise composite material. Composite material may contain reinforcing materials, such as fibers or fillers commonly known in the art, two different polymeric materials such as a thermoset core and a thermoplastic shell, a thermoplastic edge about the periphery of the thermoset polymer, conductive material disposed in a non-conductive polymer, or any combination thereof. The substrate may comprise or have at the edge of the plates a thermoplastic material that is bondable, such as melt bondable. A substrate may include one or more openings, frames, inserts, troughs, or a combination thereof.

One or more electrode plates may include one or more frames. One or more frames may facilitate stacking of electrode plates, formation of electrochemical cells, sealing of electrolyte within the electrochemical cells, housing one or more troughs, the like, or a combination thereof. The one or more frames may be located at least partially or completely about a periphery of one or more substrates. An individual frame may form an outer periphery of an individual electrode plate. The one or more frames may be separate from or integral with one or more substrates. For example, a frame may be integral with and located about a periphery of a substrate. One or more frames may be a raised edge. A raised edge may facilitate stacking. A raised edge may be a raised edge projecting from at least one of the two opposing surfaces of the electrode plate (e.g., substrate). One or more sides of the raised edge may include one or more indentations. The indentation(s) of one frame may be reciprocal with a frame from an adjacent electrode plate. The one or more indentations may function so as to nest with a frame of an adjacent electrode plate or even separator. A battery assembly may include a plurality of frames. The frames of adjacent electrode plates may align and interlock to form a seal about an electrochemical cell therebetween. The frame may function as a separator. The frame may include one or more inward facing surfaces. An inward facing surface may be the surface(s) of a raised edge which face inward toward, are adjacent to, are exposed to, or a combination thereof an active region, electrochemical cell, a separator, or any combination thereof. The frame may include or be free of one or more troughs. A frame may be comprised of non-conductive material, such as a thermoplastic material. The use of non-conductive material may enhance sealing about the outside of the battery stack. The frame may be made of a thermoplastic material which is the same or different than that of the substrate. The frame of an electrode plate, end plate, or both may have similar characteristics applicable to a frame of a separator. One or more suitable frames and edge seals may be disclosed in PCT Pub. No. WO 2020/243093, incorporated herein by reference in its entirety.

One or more of the electrode plates may include one or more active materials. The one or more active materials may function as a cathode, an anode, or both of the electrode plate. The one or more active materials may be any form commonly used in batteries to function as an anode, cathode, or both. A bipolar plate may have one or more active materials on a surface functioning as a cathode and one or more active materials on an opposing surface functioning as an anode. A monopolar plate may have one or more active materials on a surface functioning as a cathode or an anode while the opposing surface is bare of both an anode and cathode. A dual polar plate may have one or more active materials on a surface functioning as a cathode or an anode, while one or more similar active materials are on the opposing surface also functioning as a cathode or an anode. The cathode of one electrode plate may be opposing the anode of another electrode plate. The cathode may be referred to as one or more positive active materials (PAM). The anode may be referred to as one or more negative active materials (NAM). The one or more active materials may include any suitable active material which facilitates an electrochemical reaction with the electrolyte, the opposing one or more active materials, or both of the same electrochemical cell. The one or more active materials may be selected to have a reduction and/or oxidation reaction with the electrolyte.

The one or more active materials may comprise one or more materials typically used in secondary batteries, including lead acid, lithium ion, and/or nickel metal hydride batteries. The one or more active materials may comprise a composite oxide, a sulfate compound, or a phosphate compound of lithium, lead, carbon, or a transition metal. Examples of the composite oxides include Li/Co based composite oxide, such as $LiCoO_2$; Li/Ni based composite oxide, such as $LiNiO_2$; Li/Mn based composite oxide, such as spinel $LiMn_2O_4$, and Li/Fe based composite materials, such as $LiFeO_2$. Exemplary phosphate and sulfur compounds of transition metal and lithium include $LiFePO_4$, $V_2O_5$, $MnO_2$, $TiS_2$, $MoS_2$, $MoO_3$, $PbO_2$, $AgO$, $NiOOH$, and the like. One or more active materials may include lead dioxide, lead oxide, lead sulfate, or a combination thereof. For example, in a lead acid battery, the one or more active materials may be or include lead dioxide ($PbO_2$), tribasic lead oxide ($3PbO$), tribasic lead sulfate ($3PbO \cdot 3PbSO_4$), tetrabasic lead oxide ($4PbO$), tetrabasic lead sulfate ($4PbO \cdot 4PbSO_4$), or any combination thereof. One or more active materials, or sources thereof, may perform better with pickling as part of the preparation method of the battery assembly while others may not require pickling. For example, letharge as the source of lead oxide may not require pickling as part of the method for preparing a battery assembly. The one or more active materials may be in any form which allows the one or more active materials to function as a cathode, anode, or both of an electrochemical cell. Exemplary forms include formed parts, in paste form, pre-fabricated sheet or film, sponge, or any combination thereof. For example, one or more active materials may include a sponge lead. Sponge lead may be useful due to its porosity. One or more suitable active materials and/or forms thereof may be described in PCT Publications WO2018/213730 and WO2020/102677, incorporated herein by reference in their entirety for all purposes.

The battery assembly may include one or more fluids. The one or more fluids may function to create one or more electrochemical reactions; provide for pickling, forming, curing, drying, charging, discharging, thermal control cycling, and/or the like; provide for cooling and/or heating; or any combination thereof. The one or more fluids may only be temporarily part of the battery assembly during preparing, part of the battery assembly for operation, or both. One or more fluids may flow into the battery, out of the battery, be circulated through the battery, or any combination thereof. One or more fluids may be located within one or more electrochemical cells, channels, troughs, a headspace, or any combination thereof. One or more fluids may circulate through one or more openings, ports, valves, vents, channels, troughs, electrochemical cells, a headspace, or a combination thereof. The one or more fluids may be configured to add heat, remove heat, or both from the battery assembly. The one or more fluids may be configured to cure one or more materials, dry one or more materials, or both of the electrochemical cell. One or more fluids may include one or more liquids, gasses, or both. One or more fluids may include electrolyte, air, drying fluids, lead collection fluids, reactive materials, electrolyte removal fluids, the like, or a combination thereof.

One or more fluids may include air. Air may be humid air, dry air, or both. Humid air may have a relative humidity higher than the relative humidity of dry air. Humid air may have a relative humidity of about 50% or higher, 60% or higher, or even 75% or higher. Humid air may have a relative humidity of about 100% or less, 90% or less, or even 80% or less. Dry air may have a relative humidity of about 0% or greater, 5% or greater or even 10% or greater. Dry air may have a relative humidity of about 50% or less, about 40% or less, about 30% or less, or even about 20% or less. Air may find use in evacuating, curing, drying, or a combination thereof. Humid air, dry air, or both may be used in evacuating, curing and/or drying. Humid air may be followed by dry air. Dry air may be followed by humid air. Humid air and dry air may be located within the battery assembly simultaneously.

The one or more fluids may include one or more drying fluids. One or more drying fluids may aid in curing and/or drying one or more materials. One or more materials may include one or more active materials. One or more active materials may be dried my having one or more fluids removed therefrom. One or more fluids may include electrolyte, water, other reactive materials, the like, or a combination thereof. For example, active material may need to be cured after a pasting process. As another example, active material may need to be dried after being evacuated of electrolyte. And as a further example, an interior of the battery assembly may need to be dried after being flushed with water, other fluids, or both. A battery assembly empty of electrolyte may be useful as a dry charge battery assembly. One or more drying fluids may be useful for drying one or more active materials, separators, substrates, and the like of a liquid electrolyte, or other fluids within the battery assembly. One or more drying fluids may include one or more drying gasses, water sequestering liquids, critical point drying fluids, or a combination thereof. One or more drying gases may include air. Air may include dry air thus avoiding additional humidity.

One or more fluids may include one or more lead collection fluids. One or more lead collection fluids may function collect and/or remove one or more lead species. Lead collection fluids may be useful in extending the life of a battery assembly, evacuating a battery assembly, recycling and/or disposing of a battery assembly or parts thereof, the like, or any combination thereof. An exemplary lead species may include lead sulfate. Removal of lead species, such as lead sulfate, may aid in extending the life of a spent battery. One or more lead collection fluids may include acetic acid, methane sulfonic acid, the like, or a combination thereof.

The one or more fluids may include one or more reactive materials. One or more reactive materials may include one or more oxidizing agents, passivating agents, solvating agents, the like, or a combination thereof. The one or more reactive materials may include hydrogen peroxide, methane sulfonic acid, phosphoric acid, lead ions in solution, sodium sulfate, organo-lingo sulfonates, the like, or a combination thereof. One or more oxidizing agents may be useful in reducing free lead from one or more active materials. For example, the one or more oxidizing agents may reduce free lead in an unformed paste of one or more active materials. Unformed may relate to the forming step of preparing the battery assembly. One or more passivating agents may reduce, prevent, and/or stop lead corrosion. The corrosion may be lead corrosion which has a tendency to occur within the electrochemical cells. Lead corrosion may occur in the cells after forming. Forming may relate to the forming step of preparing the battery assembly.

The one or more fluids may include an electrolyte. The electrolyte may allow electrons and ions to flow between the anode and cathode. The electrolyte may be located within the electrochemical cells. The electrolyte may be liquid, gel, and/or solid. As the one or more electrochemical cells may be sealed, the electrolyte may be a liquid electrolyte. The electrolyte can be any liquid electrolyte that facilitates an electrochemical reaction with the anode and cathode utilized. The electrolyte may be able to pass through a separator of an electrochemical cell. The electrolytes can be water based or organic based. One or more suitable electrolytes may be disclosed in U.S. patent application Ser. No. 15/359, 289, incorporated herein by reference in its entirety.

Aqueous electrolytes may comprise one or more reactants. The one or more reactants may be acids, salts, or both in water which may enhance the functioning of the cell. The one or more reactants may include sulfuric acid, sodium sulfate, potassium sulfate, the like, or a combination thereof. The one or more reactants may be present in a sufficient amount to facilitate the operation of the cell, the pickling process, the formation process, or any combination thereof. The concentration of the reactant in the electrolyte may be about 0.5 weight percent or greater, about 5.0 or greater, or even about 30 weight percent or greater based on the weight of the electrolyte. A useful electrolyte in a lead acid battery may be sulfuric acid in water.

The concentration of the reactant in the electrolyte may be the same or different during pickling, formation, or operation (e.g., charging, discharging) of the cell. The reactant may be provided at a lower concentration during pickling and formation than during operation. Lower concentration may be referred to as diluted electrolyte. A diluted electrolyte may be referred to as one or more pickling fluids, forming fluids, or both. The concentration may be lower as lead is more soluble in a lower concentration reactant, which allows the pickling and formation reactions to occur more rapidly at the lower concentration. A higher concentration of the reactant allows for more energy to be generated from the battery assembly during operation (e.g., charging and discharging). Typical AGM batteries may be filled with a reactant concentration that is a compromise in performance and speed of pickling, formation, and operation. An advantage of the present teachings is that the electrolyte can be removed and replaced, thus allowing for the concentration to change for the desired performance. The electrolyte may be changed during thermal control cycling. A diluted electrolyte (e.g., lower concentration) may flow through the battery assembly during preparation and before operation. For example, a diluted electrolyte may be the one or more fluids flowing through the battery assembly during pickling and/or forming. The diluted electrolyte may be replaced with a higher concentration electrolyte.

A lower concentration of the reactant may be associated with a lower specific gravity of the electrolyte while a higher concentration of the reactant may be associated with a higher specific gravity of the electrolyte. The specific gravity of the electrolyte may be about 1.05 or greater, about 1.1 or greater or even about 1.15 or greater. The specific gravity of the electrolyte may be about 1.4 or less, about 1.35 or less, about 1.3 or less, about 1.275 or less, about 1.25 or less, or even about 1.2 or less. The specific gravity during pickling and/or formation may be less than during operation of the battery assembly. The specific gravity during pickling may be about 1.05 or greater to about 1.15 or less. For example, the specific gravity during pickling may be about 1.100. The specific gravity during operation may be about 1.20 or greater to about 1.35 or less. A lower concentration and specific gravity of the electrolyte during pickling and forming may allow for the reactant to be quickly consumed and quickly create heat within the battery through an exothermic reaction.

One or more troughs may allow for the electrolyte to rapidly and uniformly fill, evacuate, or both the one or more electrochemical cells. One or more fill channels may allow for the exchanging of hot, spent electrolyte with cool, fresh electrolyte to continue the pickling reaction while controlling a temperature of the battery assembly. The exchange allows for a quicker pickling and/or formation reaction. The one or more fill channels may allow for exchanging of a hot, lower specific gravity used for pickling and/or formation for a cooler, higher specific gravity for operation of the battery assembly. The used electrolyte may be evacuated from the same and/or a different port as the port used to fill the assembly with fresh electrolyte.

The battery assembly may include one or more separators. The one or more separators may function to partition an electrochemical cell (i.e., separate a cathode an electrochemical cell from an anode of an electrochemical cell); prevent short circuiting of the cells due to dendrite formation; functions to allow liquid electrolyte, ions, electrons or any combination of these elements to pass through it; or any combination thereof. Any known battery separator which performs one or more of the recited functions may be utilized in the battery assembly. One or more separators may be disposed within the one or more electrochemical cells. One or more separators may be located between an anode and a cathode of an electrochemical cell. One or more separators may be located between a pair of adjacent electrode plates, which may include between bipolar plates or between a bipolar plate and a monopolar plate. A separator may be attached to The battery assembly may include one or more separators. The one or more separators may function to partition an electrochemical cell (i.e., separate a cathode an electrochemical cell from an anode of an electrochemical cell); prevent short circuiting of the cells due to dendrite formation; functions to allow liquid electrolyte, ions, electrons or any combination of these elements to pass through it; or any combination thereof. One or more separators may be located between an anode and a cathode of an electrochemical cell. One or more separators may be located between a pair of adjacent electrode plates, which may include between bipolar plates or between a bipolar plate and a monopolar plate. The separators may be attached about their periphery, interior, or surface faces to one or more end plates, electrode plates, other separators, active material, or any combination thereof. The separators may be distanced from and not in contact with one or more substrates, frames, other separators, or combination thereof. The separators may extend toward one or more frames of one or more electrode plates but may be located within the interior periphery of the one or more frames. The separators may have a cross-sectional area that is less than or equal to the cross-section area of an interior of the frame. A cross-sectional area smaller than an interior of the frame allows for a peripheral gap to be located about the periphery of the separator. The separators may have a cross-sectional area that is the same or greater than the area of the adjacent cathode and anode. The separator may completely separate the cathode portion of the cell from the anode portion of the cell. The separator may absorb and retain at least some of the electrolyte. The edges of the separator may or may not contact peripheral edges of adjacent electrode plates. The peripheral edges may be the interior facing surfaces of the frames. A separator may alternatively include a frame, similar to the frame of the electrode plates. The frame of the separator may align and stack with adjacent frames of the electrode plates. A separator may be formed as one or more sheets. A separator may include or be separate from one or more transfer sheets. One or more transfer sheets may be used in lieu of or in conjunction with one or more separators. A separator may include or be synonymous with a transfer sheet. An exemplary transfer sheet suitable for use with or as a separator is described in PCT Publication WO2018/213730 and WO2020/0102677, incorporated herein by reference in their entirety for all purposes.

One or more peripheral gaps may be located within one or more electrochemical cells. The peripheral gap may provide for a transfer clearance, one or more troughs, or a combination thereof. A transfer clearance may be between the one or more separators and an inward facing surface of one or more frames. A transfer clearance may be the clearance to locate the separator and active material on a substrate within the frame while avoiding contact with the frame. The avoided contact may be with an inward facing surface of the frame. A peripheral gap may be the distance between an outer peripheral surface of one or more separators and an inward facing surface of one or more frames. This transfer clearance may be useful in a pasting process such as disclosed in PCT Publication WO2018/0213730.

One or more separators may include one or more sheets. One or more sheets may function as the portion of the separator which separates opposing active materials of an electrochemical cell; prevents short circuiting; allows electrolyte, ions, electrons, or a combination thereof to pass through; or any combination thereof. One or more sheets may include a single sheet or a plurality of sheets. A plurality of sheets may be layered to form a separator. The one or more sheets may include one or more sheets, two more sheets, or even three or more sheets. The one or more sheets may include ten or less sheets, seven or less sheets, or even five or less sheets. For example, a separator may be comprised of three or more sheets. For example, three to five of sheets may be layered to form a separator when a single port is used for both filling and venting. As another example, five to seven sheets may be layered to form a separator when two separate ports are used for filling and venting. If a plurality of sheets are used, the sheets may be stacked, co-planar with one another, or both. One or more of the sheets may or may not include one or more troughs. For example, one or more troughs may be formed in one or more sheets within an interior of a stack of sheets while one or more sheets on an exterior of the stack are free of one or more troughs. As another example, one or more troughs may be formed through some of the one or more sheets, while others remain free of one or more troughs. As a further example, one or more troughs may be formed through partially through a thickness of one sheet. And as another example, one or more troughs may just be formed by a peripheral gap or within a frame while all separator sheets are free of or one or more sheets includes one or more troughs.

The one or more sheets may be non-conductive. By being non-conductive, the separation between the active materials is facilitated. One or more non-conductive materials may be inorganic, organic, or both. Organic materials may include cotton, rubber, asbestos, wood, the like, or any combination thereof. One or more inorganic materials may include one or more polymers, glass, ceramic, the like, or any combination thereof. One or more polymers may include one or more polyesters, polyethylene, polypropylene, polyvinyl chloride, polytetrafluoroethylene, nylon, ion gels, the like, or any combination thereof. The one or more sheets may be formed by nonwoven fibers, woven fibers, films, the like, or any combination thereof. For example, the one or more sheets may be an absorbent glass mat (AGM). The one or more sheets may be absorbent, be able to retain at least some electrolyte, or both. As another example, the sheet may be a porous, ultra-high molecular weight polyolefin membrane. The sheet may be porous. Pores may allow for the electrolyte, ions, electrons, or a combination thereof to pass through the separator. Pores may be substantially straight, tortuous, or a combination thereof through a thickness of the sheet. As an example, one or more separators may be formed by one or more sheets which are porous and non-conductive.

A sheet has a thickness. The thickness may be measured as the distance between exterior faces of the sheet. The exterior faces may be those facing toward, substantially parallel with or both, an adjacent anode, cathode, or both. The thickness may be suitable to facilitate the battery assembly's energy and power density. A suitable thickness may be chosen based on the overall size of the battery assembly. A thickness of the sheet may be about 10 μm or greater, about 25 μm or greater, about 100 μm or greater, or even about 500 μm or greater. A thickness of the sheet may be about 1 cm (10,000 μm) or less, about 0.5 cm (5,000 μm) or less, about 0.3 cm (3,000 μm) or less, or even about 0.1 cm (1,000 μm) or less. For example, a thickness of a sheet may be about 500 μm to about 0.3 cm. A thickness of the sheet may be uniform or variable across all or a portion of the sheet. A variable thickness may be due to one or more troughs formed in the separator.

One or more electrochemical cells may include one or more troughs. The one or more troughs may function to guide the flow of electrolyte into the one or more electrochemical cells, guide the flow of electrolyte wicking through the separator, provide for faster flow of electrolyte wicking through the one or more separators, provide for more uniform distribution of the electrolyte along the separator and/or within each electrochemical cell, expedite filling and/or evacuating of the electrochemical cells with electrolyte, increase the efficiency of the pickling process and/or forming process, collect one or more gases generated in an interior of the battery, or any combination thereof. The one or more troughs may have any size, shape, and/or configuration such as to distribute electrolyte. The one or more troughs may be formed within the one or more electrochemical cells.

The one or more troughs may be exposed to, face toward, be in fluid communication with, or a combination thereof an interior of the one or more electrochemical cells. An interior of the electrochemical cells may be the active region of the cell. An active region may be the area of a cell housing one or more active materials, one or more separators, an electrolyte, or a combination thereof. An active region may be the area of a cell in which electrochemical reactions occur.

The one or more troughs may be in fluid communication with one or more openings, channels, vents, ports, valves, the like, or a combination thereof. One or more troughs may be in fluid communication with one or more fill openings. One or more fill openings may include fill openings of a separator, electrode plate, or both. One or more troughs may be in fluid communication with one or more fill channels. One or more troughs may be in fluid communication with one or more fill channels via one or more vents, fill openings, or both. One or more troughs may include a plurality of troughs which radiate from one or more fill openings. Radiate may mean extending from, forming an array about, being disseminate from, all flow from, the like, or a combination thereof.

The one or more troughs may be formed in one or more separators, a peripheral gap, one or more electrode plates, or any combination thereof. One or more troughs may be formed in one or more frames, substrates, or both of one or more electrode plates. One or more troughs may be formed in one or more inward facing surfaces of one or more frames. One or more troughs may be formed on one or more surfaces of one or more substrates (e.g., surface inward facing into the cell). One or more troughs may be formed in one or more sheets of one or more separators. One or more troughs may be formed, at least partially, by one or more peripheral gaps. The one or more troughs may be voids in the one or more sheets, one or more frames, or both. The one or more troughs may project inward from one or more exterior faces of a sheet. The one or more troughs may be one or more depressions in one or more inward facing surfaces of one or more frames. Exemplary troughs may include one or more channels, tunnels, ducts, grooves, passages, notches, the like, or any combination thereof.

The one or more troughs may be substantially straight, nonlinear, uneven, curved, varying, the like, or any combination thereof. For example, the sheet may include a plurality of substantially straight troughs. As another example, the peripheral gap may form a trough reciprocal with the peripheral shape of the separator. The one or more troughs may have one or more surfaces which are planar, non-planar, or a combination thereof. The one or more troughs may be voids of sheet material, frame, or both shaped like one or more cuboids, cubes, cylinders, spheres, cones, the like, or any combination thereof. For example, the one or more troughs may have substantially planar surfaces such that the voids are substantially cuboidal. As another example, the troughs may have substantially curved surfaces such that the voids of the sheet material resemble cylinder-halves (e.g., "C-shaped"). As another example, the troughs may have both substantially planar surfaces and a curved surface such that the voids of the sheet material resemble a combination of a cylinder half and a cuboid (e.g., "D-shaped").

The one or more troughs may include a single trough or a plurality of troughs. A plurality of troughs may allow for the liquid electrolyte to flow through the separator faster than a single trough. A plurality of troughs may be in fluid communication with one another. A linear segment, continuous segment, or both may be referred to as a single trough. One or more troughs may intersect with, abut to, be distanced from, or a combination thereof one or more other troughs. One or more troughs may be substantially parallel to, distanced from, or both one or more peripheral edges of the one or more sheets. One or more troughs may be located about one or more separators. One or more troughs may be located within an interior surface of one or more frames. One or more troughs may be in fluid communication with, facing toward, and/or within an active region of one or more electrochemical cells. One or more troughs may be located between one or more openings and one or more peripheral edges. One or more troughs may be located between a plurality of openings. For example, one or more troughs may be located between adjacent arrays of openings, parallel to the arrays, or both. A plurality of troughs may form a repetitive pattern, be staggered, or be offset on a sheet of a separator.

A plurality of troughs may include one or more main troughs, branching troughs, or a combination thereof. A main trough may be a trough closest to incoming fluid, the trough to first be wetted by the electrolyte, or both. The one or more branching troughs may be troughs in fluid communication with the main trough, be wetted with electrolyte after a main trough, or both. One or more branching troughs may be downstream of one or more main troughs, channels, or both. One or more branching troughs may be distanced from one or more openings. A main trough may function to distribution one or more fluids to one or more branching troughs. A main trough may function to collect one or more fluids from one or more branching troughs. A main trough may abut to, be directly adjacent with, in fluid communication with, or a combination thereof a plurality of branching troughs. The main trough may include only a single trough on a separator sheet, a trough formed by a peripheral gap, a trough formed in a frame, or a combination thereof. The branching troughs may include 1 or more, 2 or more, 3 or more, or even 4 or more troughs on a separator sheet. The branching troughs may include 10 or less, 6 or less, or even 5 or less troughs on a separator sheet. A main trough, branching troughs, or both may be in direct communication with one or more fill openings, fill channels, inlet troughs, or a combination thereof. For example, a main trough may be in direct fluid communication with one or more channel openings and then guide the flow of fluid to one or more branching troughs. As an example, a plurality of branching troughs may all be in direct fluid communication with a fill opening. As another example, a main trough may be located between one or more inlet troughs and one or more branching troughs. And even as another example, a main trough may be in fluid communication with an inlet trough while no branching troughs are present. A plurality of troughs may be free of one or more main troughs, branching troughs, or both.

The one or more troughs may include one or more inlet troughs. The one or more inlet troughs may be in fluid communication with one or more openings, channels, or both which receive one or more fluids. The one or more inlet troughs may be in fluid communication with one or more fill openings, fill channels, vents, or a combination thereof. The one or more inlet troughs may allow for an electrolyte or other fluids to be received from one or more fill openings, fill channels, or vents. The one or more inlet troughs may be in fluid communication with, direct contact with, adjacent to, abut to, intersect with, or a combination thereof one or more other troughs. Other troughs may include one or more main troughs, branching troughs, or both. One or more inlet troughs may distribute one or more fluids to one or more main troughs, branching troughs, or both. The one or more inlet troughs may be in direct contact with, adjacent to, abut to, intersect with, or a combination thereof the one or more main branches, openings, vents, channels, or a combination thereof. The one or more inlet troughs may be in fluid communication with one or more fill channels. The one or more troughs may be free of one or more inlet troughs.

The one or more troughs may have a thickness, width, and length. A thickness of a trough may be considered a depth of the void through the thickness of the sheet or frame, a distance between two opposing surfaces of adjacent substrates at the peripheral gap, may be measured parallel to a thickness of the sheet (if the part of sheet or peripheral gap), may be measured parallel with a surface of the sheet having active material thereon (if part of a frame), or any combination thereof. A width of a trough may be considered a distance between surfaces of the sheet or frame forming the void, the distance between an inward facing surface of a frame and a peripheral surface of a separator (if formed in the peripheral gap), the smaller of the width and length, may be perpendicular to the depth, or any combination thereof. A length of a trough may be considered a distance between surfaces of the sheet forming the void, the larger of the width and length, may be perpendicular to the depth and width, may be parallel to an inward facing surface, may be parallel to a peripheral edge of a separator, or any combination thereof. One or more troughs may have a depth partially or completely through a thickness of the sheet. One or more troughs may have a depth only partially through the frame. A partial depth in the frame may allow the frame to still provide a seal about an electrochemical cell. One or more troughs may have a depth equal to or less than the distance between the two substrate surfaces facing one another to form an electrochemical cell. The one or more troughs may not completely pass through a thickness of a sheet, as otherwise the separation between a pair of active materials (anode and cathode) of an electrochemical cell would be eliminated. If a plurality of sheets are used, one or more troughs may pass completely through a thickness of one or more sheets. The one or more troughs may have a depth which is about 5% or greater, about 10% or greater, about 25% or greater, or even about 50% or greater than the overall thickness of the separator, width of a frame, or both. The one or more troughs may have a depth which is about 100% or less, about 90% or less, about 80% or less, or even about 75% or less than the overall thickness of the separator. The one or more troughs may have a depth which is about 80% or less, 70% or less, or even 60% or less than a width of a frame. A width of a frame may be considered a distance between an inward facing surface to an opposing exterior facing surface (e.g., without crossing over the active region). A depth of one or more troughs may be about 10 µm or greater, about 25 µm or greater, about 100 µm or greater, or even about 500 µm or greater. A depth of the one or more troughs may be about 1 cm (10,000 µm) or less, about 0.5 cm (5,000 µm) or less, about 0.3 cm (3,000 µm) or less, or even about 0.1 cm (1,000 µm) or less. For example, a depth of one or more troughs may be about 0.5 mm to about 2 mm. The depth of a trough may be measured as the depth through a single or through a plurality of sheets. The one or more widths may have a width suitable for the one or more troughs to be located in between one or more openings, be the peripheral gap, or be located within an inward facing surface of a frame. The one or more troughs may have an aspect ratio between the depth and width. The aspect ratio promotes rapid electrolyte wicking through the one or more sheets of the separator. The aspect ratio of depth to width may be 1:10 or greater, about 1:5 or greater, or even about 1:3 or greater. The aspect ratio of depth to width may be about 10:1 or less, about 5:1 or less, about 3:1 or less, or even about 1:1 or less. For example, the aspect ratio of depth to width may be about 1:5 to about 1:1 (e.g., 1:3). The one or more troughs may have a width which is about 0.01% or greater, about 0.05% or greater, about 1% or greater, about 3% or greater, or even about 5% or greater than a width of the separator sheet or a height of a frame (e.g., substrate surface to edge). The one or more troughs may have a width which is about 30% or less, 15% or less, about 12% or less, or even about 10% or less than a width of the separator sheet or height of a frame. The one or more troughs may have a length. The length may be suitable for helping expedite electrolyte flow across as much of a length of a separator sheet as possible. The length may allow for the one or more troughs to pass by one or more openings, even a plurality of openings. The one or more troughs may have a length about 5% or greater, about 10% or greater, about 25% or greater, about 50% or greater, or even about 75% or greater than a length of a sheet of the separator or a length of an inward facing surface of a frame. The one or more troughs may have a length which is about 100% or less, 95% or less, about 90% or less, or even about 85% or less than a length of a sheet of the separator or a length of a frame.

The one or more troughs may include one or more compressed portions in one or more separators, one or more areas of removed material of one or more separators, or both. Material may be compressed and/or removed to achieve a lesser thickness than other areas of the separator. The one or more troughs may be formed by material removal, compression, molding, lack of material, or a combination thereof. For example, one or more troughs may be formed by removing sheet material. As an example, one or more troughs may be formed by embossing sheet material. One or more troughs may be embossed portions of one or more sheets to form the one or more compressed portions. As another example, one or more troughs may be formed by molding into one or more frames. And as another example, one or more troughs may be formed by the absence of material (e.g., active material, conductive materials, separator, and the like) in a peripheral gap.

One or more troughs may be temporary, semi-permanent, permanent, or a combination thereof. If troughs are formed by compression, the one or more troughs may be persistent, re-expand, or both. If troughs are formed by removal, molding processes, or the like, the troughs may permanently remain in place.

Re-expansion of one or more troughs may occur after the pickling process, formation process, curing process, drying process, or a combination thereof. Re-expansion may occur due to reaching a certain temperature within an interior of the battery assembly, over passing a duration of time, upon contact with one or more fluids, or a combination thereof. Re-expansion may occur after a minimum duration of contact with an electrolyte. A minimum duration may be, at minimum, the time to fill the electrochemical cells with electrolyte for a filling process. A minimum duration may be the time to fill the electrochemical cells, optionally go through pickling, go through formation, and/or provide for thermal cycling. Re-expansion may occur after completing the pickling and/or forming process. Re-expansion may occur after thermal control cycling. Re-expansion may be considered as rebounding. One or more troughs may be temporary and/or semi-permanent and are configured to at least partially expand. Partially expanding may mean to an increased thickness. The thickness may be of the separator at the troughs. Re-expansion may be partial or complete. For example, after re-expansion, the one or more troughs may expand in thickness but still have a thickness smaller than the remainder of the sheet. A partial re-expansion may be considered a semi-permanent trough. As another example, after re-expansion, the one or more troughs may expand in thickness such that the sheet has a substantially uniform thickness. A complete re-expansion may be considered a temporary trough.

One or more troughs may be formed by voids of material in one or more sheets while other sheets remain free of one or more voids. A stack of sheets may form a separator. One or more interior sheets may include one or more voids going through a portion, entirety, or both the individual sheet thickness. For example, one or more interior sheets of a separator may include one or more troughs while opposing outer sheets of the stack may be free of any troughs. One or more interior sheets may include one or more troughs while one or more other interior sheets may be free of one or more troughs. For example, two or more adjacent interior sheets may each include one or more troughs aligned with one another. As another example, three or more adjacent interior sheets may have alternating troughs, such that two have one or more troughs while one is free of any troughs. The outer sheets, one or more interior sheets, or both may cooperate with interior sheets such that the troughs are closed-off (e.g., have 4 walls) and formed as one or more ducts through the separator. Having the outer sheets free of one or more troughs may allow for the separator to have a uniform and continuous surface area exposed within the electrochemical cells during operation of the battery assembly.

The one or more troughs may be in fluid communication with an electrolyte source. By being in fluid communication with an electrolyte source, the one or more troughs may absorb and allow for electrolyte to pass quicker therethrough, flow to one or more other troughs, or both. Fluid communication may be direct, indirect, or both. For example, one or more troughs may be in fluid communication with one or more vents, openings, ports, channels, valves, the like, or a combination thereof. One or more troughs may abut to one or more openings, one or more vents of an opening, or both. One or more openings may include those that form a channel. The channel may be a fill channel, vent channel, or both. For example, an inlet trough may be in direct fluid communication with an opening of a separator which is part of the fill channel and abut to and be in fluid communication with a main trough.

The one or more troughs may significantly reduce the amount of time it takes to fill a battery assembly with electrolyte. To achieve the electrochemical cells of a battery assembly being about 90% to 100% filled with electrolyte, the one or more troughs may significantly reduce the fill time. The fill time to 90% full may be reduced by about 25% or greater, about 35% or greater, about 45% or greater, or even by about 50% or greater. The fill time to 90% full may be reduced by 95% or less, about 90% or less, about 85% or less, or even about 75% or less. The fill time reduction may be as compared to an identical battery assembly having no troughs. As an example, without troughs, a fill time of a battery assembly to 90% full may take about 14.5 minutes while with 5 troughs (1 main trough and 4 branching troughs), a fill time of a battery assembly to 90% full may take about 1 minute, achieving an improvement in time of about 90%. The fill time to 100% full may be reduced by about 25% or greater, about 40% or greater, about 50% or greater, or even about 60% or greater. The fill time to 100% full may be reduced by about 95% or less, about 85% or less, about 75% or less, or even by 70% or less. As an example, without troughs, a fill time of a battery assembly to 100% full may take about 45 minutes while with 5 troughs (1 main trough and 4 branching troughs), a fill time of a battery assembly to 100% may take about 14.5 minutes, achieving an improvement in time of about 68%. The time to 100% full may be inclusive of cycling about 5-50% of the electrolyte volume out and replacing with cooled electrolyte of the battery assembly to help aid in temperature control.

One or more electrode plates, end plates, separators, or a combination thereof may include one or more openings. The one or more openings may function to provide an opening for an attachment mechanism to pass therethrough; cooperate with one or more electrode plates, separators, end plates, and/or inserts to form part of one or more channels; house or be part of one or more seals; allow for vacuum pulling, filling, and/or venting of the battery assembly; provide for circulation of a fluid through one or more channels; retain one or more electrically conductive materials; or any combination thereof. The one or more openings may have any size, shape, and/or configuration to provide any combination of the desired functions. The one or more openings may have any combination of the features as described for openings and/or holes in one or more electrode plates, end plates, and/or substrates. One or more openings of one or more electrode plates, end plates, and/or separators may align (i.e., be concentric) with one or more openings of one or more other electrode plates, end plates, and/or separators so as to form one or more channels. Alignment may be in a transverse direction. Transverse may mean substantially perpendicular to a face of a substrate and/or separator, across a length of the battery assembly, parallel to a longitudinal axis of the battery assembly, or a combination thereof. The transverse direction may be substantially perpendicular the opposing surfaces of the substrates upon which a cathode and/or anode may be deposited. Transverse may mean that the general width, diameter, or both of a cross-section of the one or more openings is substantially parallel to a face of a substrate and/or separator. One or more openings of an electrode plate, end plate, and/or substrate may have a shape and/or size similar to one or more openings of another electrode plate, end plate, and/or separator which may be adjacent. The one or more openings may have a cross-sectional shape which functions to receive an attachment mechanism, receive a post, cooperate with an insert, or any combination of the desired functions of the openings and may be generally rectangular, circular, triangular, elliptical, ovular, or any combination thereof. The one or more openings may have a cross-sectional width sufficient to receive one or more attachment mechanisms, one or more posts, one or more valves, or any combination thereof. The openings may be machined (e.g., milled), formed during fabrication of the substrate (e.g., by a molding or shaping operation), or otherwise fabricated. The openings may have straight and/or smooth internal walls or surfaces.

The one or more openings may pass partially or completely through an insert, a base, a substrate, a separator, a reinforcement structure, a rib structure, or any combination thereof. The one or more openings may be located about or adjacent a periphery, within an interior, or both of an end plate, electrode plate, separator, or combination thereof. The one or more openings may be distributed about a periphery, within an interior defined within the periphery, or both of an end plate, electrode plate, separator, or a combination thereof. The one or more openings may be located adjacent to one or more rib structures, between two or more rib structures, within a cell, adjacent one or more inserts, within one or more inserts, or any combination thereof. The one or more openings may form a repetitive pattern, may be aligned with one or more other openings, may be staggered or offset from one or more other openings, or any combination thereof.

The size and frequency of the openings formed in the substrate may affect the resistivity of the battery. One or more openings may have a cross-sectional width less than, equal to, or greater than a diameter of one or more openings formed within the same end plate and/or an adjacent electrode plate. A cross-sectional width of one or more openings may be continuous, taper, or expand along a length of an opening. A cross-sectional width of one or more openings may be suitable for receive one or more posts, rods, fluids, electrolyte, or a combination thereof therethrough. The one or more openings may have a cross-sectional width of about 0.2 mm or more, 1 mm or more, about 3 mm or more, or even about 5 mm or more. The one or more openings may have a cross-sectional width of about 30 mm or less, about 25 mm or less, or even about 20 mm or less. A cross-sectional width of an opening may be considered the same as a diameter of an opening. One or more openings of an electrode plate, end plate, and/or substrate may have a larger diameter than one or more other openings of the same electrode plate, end plate, and/or substrate. An opening may be about at least about 1.5 times, at least about 2 times, or even at least about 2.5 times larger than another opening. An opening may be about 4 times or less, about 3.5 times or less, or even about 3 times or less larger than another opening. The openings may be formed having a density of at least about 0.02 openings per cm². The openings may be formed having a density of less than about 4 openings per cm². The openings may be formed having a density from about 2.0 openings per cm² to about 2.8 openings per cm². The one or more openings may include one or more peripheral openings, one or more internal openings, one or more channel openings, one or more conductive openings, the like, or any combination thereof. Exemplary openings may be discussed in U.S. Pat. No. 10,141,598, incorporated herein by reference in its entirety.

One or more openings may include one or more channel openings. The one or more channel openings may function to align with one or more openings of one or more electrode plates to form one or more channels; provide an opening for venting, filling, and/or venting the battery assembly; providing an opening for circulating one or more fluids within an interior of the battery assembly; cooperate with one or more valves and/or ports, receive one or more posts to compress the stack of electrode plates; receive one or more inserts; or any combination thereof. The one or more channel openings may align (i.e., concentric alignment) with one or more openings and/or holes of one or more electrode plates, end plates, and/or separators in a transverse direction to form one or more channels through the stack. A plurality of openings may align to form one or more channels. Plurality may mean a plurality of openings in a single component or a plurality of openings across a plurality of components (e.g., electrode plates, separators, active material, inserts, etc.). The one or more channel openings may have a size substantially equal to one or more holes of one or more other electrode plates, end plates, and/or separators. The channel openings of one or more separators may be equal to or larger than channel openings of one or more electrode plates. The one or more channel openings of one or more separators may allow for one or more inserts to extend therethrough, such as from an adjacent electrode plate. The one or more channel openings may have any size through which one or more posts, fluids, inserts, or a combination may pass through. One or more channel openings may have a smaller, equal, or larger cross-sectional width or area than one or more other channel openings. For example, one channel opening may have a larger diameter than one or more other channel openings to allow for filling, venting, cooling, and/or heating of the battery. One or more channel openings may be connected to or in communication with one or more valves and/or ports. For example, a channel opening having a larger diameter than other channel openings may be connected to a valve or port. One or more channel openings part of or having a fill channel pass therethrough may be referred to as one or more fill openings. One or more fill openings of one or more separators may be part of or have a fill channel pass therethrough. One or more fill openings of one or more electrode plates may be part of a fill channel. One or more channel openings part of or having a support channel, post, or both pass therethrough may be referred to as one or more support openings. A surface of the base near and/or adjacent to one or more channel openings may be a sealing surface.

One or more openings may include one or more conductive openings. One or more conductive openings may be filled with an electrically conductive material, e.g., a metallic-containing material. The one or more conductive openings may be formed in one or more electrode plates, end plates, substrates, or a combination thereof. The electrically conductive material may be a material that undergoes a phase transformation at a temperature that is below the thermal degradation temperature of the substrate so that at an operating temperature of the battery assembly that is below the phase transformation temperature, the dielectric substrate has an electrically conductive path via the material admixture between the first surface and the second surface of the substrate. Further, at a temperature that is above the phase transformation temperature, the electrically conductive material admixture undergoes a phase transformation that disables electrical conductivity via the electrically conductive path. For instance, the electrically conductive material may be or include a solder material, e.g., one comprising at least one or a mixture of any two or more of lead, tin, nickel, zinc, lithium, antimony, copper, bismuth, indium or silver. The electrically conductive material may be substantially free of any lead (i.e., it contains at most trace amounts of lead) or it may include lead in a functionally operative amount. The material may include a mixture of lead and tin. For example, it may include a major portion tin and a minor portion of lead (e.g., about 55 to about 65 parts by weight tin and about 35 to about 45 parts by weight lead). The material may exhibit a melting temperature that is below about 240° C., below about 230° C., below about 220° C., below 210° C. or even below about 200° C. (e.g., in the range of about 180 to about 190° C.). The material may include a eutectic mixture. A feature of using solder as the electrically conductive material for filling the openings is that the solder has a defined melting temperature that can be tailored, depending on the type of solder used, to melt at a temperature that may be unsafe for continued battery operation. Once the solder melts, the substrate opening containing the melted solder is no longer electrically conductive and an open circuit results within the electrode plate. An open circuit may operate to dramatically increase the resistance within the bipolar battery thereby stopping further electrical flow and shutting down unsafe reactions within the battery. Accordingly, the type of electrically conductive material selected to fill the openings can vary depending on whether it is desired to include such an internal shut down mechanism within the battery, and if so at what temperature it is desired to effect such an internal shutdown. The substrate will be configured so that in the event of operating conditions that exceed a predetermined condition, the substrate will function to disable operation of the battery by disrupting electrical conductivity through the substrate. For example, the electrically conductive material filling holes in a dielectric substrate will undergo a phase transformation (e.g., it will melt) so that electrical conductivity across the substrate is disrupted. The extent of the disruption may be to partially or even entirely render the function of conducting electricity through the substrate disabled. One or more conductive openings may be smaller than or equal in size (e.g., in diameter) to one or more other openings of an end plate, electrode plate, substrate, or a combination thereof. One or more conductive openings may have a diameter that is about 1% of or greater, 5% of or greater, 10% of or greater, or even about 25% of or greater as compared to a diameter of one or more other openings (e.g., channel openings, peripheral openings, internal openings). One or more conductive openings may have a diameter about 75% of or less, about 50% of or less, or even about 40% of or less as compared to a diameter of one or more other openings.

One or more electrode plates, end plates, separators, or any combination thereof may include one or more inserts. The one or more inserts may function to interlock with one or more inserts of another electrode plate, end plate, separator, or a combination thereof; to define a portion of one or more channels passing through the stack; forming a leak proof seal along one or more channels; cooperate with one or more valves and/or ports; providing a housing for one or more posts; allow for a fluid to pass therethrough; or any combination thereof. The one or more inserts may have any size and/or shape to interlock with one or more inserts of an electrode plate, end plate, and/or separator; form a portion of a channel; form a leak proof seal along one or more channels; cooperate with one or more valves and/or posts; or any combination thereof. The one or more inserts may be integral with or attached to an electrode plate, end plate, separator, or a combination thereof. The one or more inserts may be integral with or attached to a substrate, base, or both. The one or more inserts may be formed as one or more bosses. An insert which is integral with a surface of an end plate (e.g., base), electrode plate (e.g., substrate), and/or separator and projects from that surface may be defined as a boss. The one or more inserts may be integrally formed through compressive forming, tensile forming, molding, or the like, or any combination thereof. Compressive forming may include die forming, extrusion, indenting, the like, or any combination thereof. Molding may include injection molding. Where an electrode plate, end plate, and/or separator has both inserts and a frame, raised edges, and/or a recessed portion, these parts may be molded in one step, for instance by injection molding. One or more inserts may project from a surface of an end plate, electrode plate, and/or separator thus forming one or more raised inserts. One or more inserts may project from a base of an end plate, substrate of an electrode plate, a surface of a separator, or any combination thereof. One or more inserts may project substantially orthogonally or oblique from a surface of the base, substrate, separator, or a combination thereof. The one or more inserts may have one or more openings therethrough. The one or more inserts may have one or more peripheral openings, internal openings, channel openings, or a combination thereof therethrough. The one or more inserts may be concentric and formed about one or more openings. One or more inserts may extend a length of an opening (e.g., an opening may pass entirely through an insert). A sealing surface may be formed between the outer diameter of one or more openings and an interior of one or more inserts. For example, a surface of the base and/or substrate substantially perpendicular to a longitudinal axis of the battery located between an insert and an opening may be a sealing surface. One or more inserts may mate with one or more other inserts. Mating may mean aligning, nesting, interlocking, or combination thereof. Upon mating, the one or more inserts may form a seal. The seal may seal the one or more channels from an electrolyte, such as the liquid electrolyte. The seal may be a channel seal. One or more inserts may be capable of interlocking with one or more inserts of an adjacent electrode plate, separator, and/or end plate to form a leak proof seal about a channel. For example, one or more end plates and/or electrode plates may be machined or formed to contain matching indents, on a surface opposite from an insert, for inserts, sleeves, or bushings of an adjacent electrode plate and/or separator.

One or more inserts may contain one or more vents. A vent may allow for fluid communication between an opening passing through the insert and the exterior environment located about the insert. The vent may allow communication between one or more electrochemical cells and one or more channels. One or more vents may allow transmission of gasses from one or more electrochemical cells to one or more channels and prevent the transmission of one or more liquids (i.e., an electrolyte) from one or more electrochemical cells to one or more channels. One or more vents may place one or more channels in fluid communication with a headspace of the battery assembly. Inserts forming a channel in close proximity and/or in the headspace of the battery assembly may include one or more vents. One or more vents may be formed as a notch or cut-out. The notch may extend from the opening to the exterior of the insert. One, some, or all of the inserts of an electrode plate may include a vent. Inserts which form a fill channel, vent channel, or both may include one or more vents. Inserts which intentionally need to distribute fluid, collect fluid, or both from electrochemical cells may include one or more vents. Inserts which form one or more support channels may be free of one or more vents. Inserts which have fluid flowing therethrough which should not be exposed to the electrochemical cells may be free of one or more vents. Inserts part of a vent channel may have one or more vents located above, distanced from, or both the electrolyte of the electrochemical cells. Vents of inserts may be able to receive gasses created during operation of the battery assembly without receiving the electrolyte. Vents may be able to direct gasses from one or electrochemical cells and through more channels and toward one or more valves (e.g., vents in inserts of a vent channel). Vents may be able to direct one or more fluids from one or more valves, valve holes, and/or ports toward and/or through one or more channels (e.g., vents in inserts of a fill channel), one or more troughs, into the electrochemical cells, or a combination thereof.

The battery assembly may include one or more channels. The one or more channels may function as one or more venting, filling, cooling, and/or heating channels; house one or more posts; distribute one or more posts throughout an interior of the battery assembly; prevent liquid electrolyte from coming into contact with one or more posts or other components; allow for circulation of one or more fluids within an interior of the battery assembly; collect one or more gases; or any combination thereof. The one or more channels may be formed by one or more openings of one or more end plates, electrode plates, and/or separators which are aligned. The one or more channels may be formed by one or more channel openings of one or more end plates, electrode plates, and/or separators aligned with one or more channels openings of other (e.g., adjacent) end plates, electrode plates, and/or separators. The one or more channels may be referred to as one or more integrated channels, transverse channels, or both. The one or more channels may pass through one or more electrochemical cells, active regions, or both. By passing through one or more electrochemical cells, the one or more channels may also pass through a liquid electrolyte, one or more active materials, the separator, or a combination thereof. The channels may be sealed to prevent electrolytes and gasses evolved during operation from entering the channels. One or more channels may be partially unsealed, such as to collect and vent gasses evolved during operation, receive and distribute one or more fluids, or both. Any method of sealing which achieves this objective may be utilized. One or more seals, such as inserts, of the one or more end plates, electrode plates, and separators may interlock and surround one or more channels to prevent the liquid electrolyte from leaking into one or more channels. The one or more channels may pass through the battery assembly in a transverse direction to form one or more transverse channels.

The size and shape of the channels can be any size or shape which allows them to house one or more posts. The cross-sectional shape of the channels may be round, elliptical or polygonal, such as square, rectangular, hexagonal and the like. The cross-sectional shape may be determined by the cross-sectional shape of the one or more openings, inserts, posts, ports, vents, and/or the like. The size of the channels housing one or more posts is chosen to accommodate the posts used. The diameter of the channel may be equal to the diameter of the openings which align to form one or more channels. The plurality of channels may have a cross-sectional size of about 2 mm or greater, about 4 mm or greater or about 6 mm or greater. The upper limit on the cross-sectional size of the channels is determined by practicality, if the size is too large the efficiency of the assemblies is reduced. The channels may have a cross-sectional size of about 30 mm or less, about 25 mm or less, or even about 20 mm or less.

The one or more channels may comprise a series of openings in the components. A series of openings may be arranged so a post can be placed in the channel formed; so a fluid can be transmitted through the channel for cooling and/or heating; for venting; for filling with one or more fluids; for distributing one or more fluids into one or more electrochemical cells; for retaining one or more fluids sealed within a channel; or any combination thereof.

The number of channels is chosen to support the end plate and edges of the end plates, electrode plates, and substrates to prevent leakage of electrolytes and gasses evolved during operation and to prevent the compressive forces arising during operation from damaging components and the seal for the individual electrochemical cells. A plurality of channels may be present so as to spread out the compressive forces generated during operation. The number and design of channels is sufficient to minimize edge-stress forces that exceed the fatigue strength of the seals. The locations of a plurality of channels are chosen so as to spread out the compressive forces generated during operation. The channels may be spread out evenly through the stack to better handle the stresses.

One or more channels having one or more fluids passed therethrough may be referred to as one or more heating channels, cooling channels, fill channels, vent channels, or a combination thereof. One or more heating, cooling, fill, and/or vent channels may be converted and/or used as one or more support channels. For example, after one or more fluids pass through the channel, the fluids may be emptied, and the channel may have a post located therein. One or more channels having one or more posts passed therethrough may be referred to as one or more support channels.

One or more channels may include one or more fill channels. The one or more fill channels may function to receive and distribute one or more fluids into one or more electrochemical cells, be useful as a vent channel, collect one or more gasses from one or more electrochemical cells, guide one or more gasses out of the battery, or any combination thereof. One or more fill channels may be one or more channels may be adapted to receive and distribute electrolyte, receive and distribute gasses for venting, or both. One or more fill channels may be formed by one or more fill openings, inserts, inserts with vents, or any combination thereof. One or more fill channels may include or be in fluid communication with one or more ports, valves, or both. One or more fill channels may be in fluid communication with one or more fill ports, evacuation ports, or both.

One or more channels may include one or more vent channels. The one or more vent channels may function to collect and release one or more gasses. The one or more gases may be generated from an interior of the battery assembly. The one or more gasses may occur during pickling, forming, thermal cycling, charging, discharging, the like, or a combination thereof. The one or more gases may include hydrogen, oxygen, or both. The one or more vent channels may function similar to, but in reverse, as one or more fill channels. The one or more vent channels may be the same as or separate from the one or more fill channels.

Gas collection may allow for accelerated battery corrosion. Accelerated battery corrosion may allow for accelerated life testing of a battery assembly. Accelerated life testing may allow for battery assemblies to be more quickly tested in research settings as opposed to the expected number of cycles before reaching end of life.

The battery assembly may comprise one or more channel seals. The one or more channel seals may prevent electrolyte and gasses evolved during operation from leaking from the cells into the channels, one or more fluids circulating through one or more channels leaking into the one or more cells, or both. One or more channel seals may be located in a channel, about an exterior of a channel, about a post; or a combination thereof. The channel seal can be one or more membranes, sleeves, gaskets, bushings and/or a series of matched inserts in the end plates, electrode plates, and/or separators, inserted in the channel, and/or residing w/in an opening. One or more gaskets may include molded in compliable features, liquid gaskets suitable for curing, flat gaskets, O-rings, and the like. The channel can be formed by a series of sleeves, gaskets, bushings, inserts, or a combination thereof which are inserted or integrated into the end plates, electrode plates, and/or separators. One or more channel seals may be compressible or capable of interlocking with one another to form a leak proof seal along the channel. The channel seal can be prepared from any material that can withstand exposure to the electrolyte, circulating fluids, operating conditions of the electrochemical cells, forces exerted by inserting a post or by the post in the channel, or a combination thereof. The one or more channel seals may be comprised of one or more polymeric materials. The one or more polymeric materials may be substantially rigid, elastomeric, or a combination of both. For example, one or more sleeves and/or inserts may be relatively rigid. For example, one or more gaskets, bushings, and/or membranes may be substantially elastomeric. One or more heating, cooling, vent, and/or fill channels may be converted to one or more support channels by including one or more channel seals. One or more channel seals may temporarily and/or permanently cover one or more vents of one or more inserts.

The battery assembly may include one or more posts. The one or more posts may function to hold the stack of components together in a fashion such that damage to components or breaking of the seal between the edges of the components of the stack is prevented, ensure uniform compression across the separator material, and ensure uniform thickness of the separator material. The one or more posts may or may not be reusable. The one or more posts may have on each end an overlapping portion which engages the outside surface of opposing end plates, such as a sealing surface of each end plate. The overlapping portion may function to apply pressure on outside surfaces of opposing end plates in a manner to prevent damage to components or breaking of the seal between the edges of the components of the stack and prevent bulging or other displacements of the stack during battery operation. The overlapping portion may be in contact with a sealing surface of an end plate. The stack may have a separate structural or protective end-piece over the monopolar endplate and the overlapping portion will be in contact in with the outside surface of the structural or protective end-piece. The overlapping portion can be any structure that in conjunction with the post prevents damage to components or breaking of the seal between the edges of the components of the stack. Exemplary overlapping portions include bolt heads, nuts, molded heads, brads, cotter pins, shaft collars and the like. The posts are of a length to pass through the entire stack and such length varies based on the desired capacity of the battery. The posts may exhibit a cross-section shape and size so as to fill a channel. The posts may have a cross-sectional size less than, equal to, or even greater than the cross-sectional size of one or more channels. The posts may form an interference fit with one or more of the channels. The number of posts is chosen to support the end plate and edges of the substrates to prevent leakage of electrolytes and gasses evolved during operation and to prevent the compressive forces arising during operation from damaging components and the seal for the individual electrochemical cells, and to minimize edge-stress forces that exceed the fatigue strength of the seals. The plurality of posts may be present so as to spread out the compressive forces generated during operation. There may be fewer posts than channels where one or more of the channels are utilized as cooling channels, heating channels, vent channels, fill channels, or a combination thereof. For example, there may be four channels with three channels having a post located therein and one channel may be used as a cooling, heating vent, and/or fill channel. As another example, there may be six total transverse channels with five support channels having a post therein and one fill channel. The posts can comprise molded posts, threaded posts or posts with one or more end attachments. The posts may be bonded to parts of the stacks, for example the substrates, inserts in the channels, and the like. The bonds can be formed from adhesives or fusion of the polymeric materials, such as thermoplastic materials. Where the parts are threaded, the structural parts of the stack are threaded to receive the threaded posts. Posts can have a head on one end and a nut, hole for a brad or cotter pin on the other or may have a nut, hole for a brad or cotter pin on both ends. This is generally the case for non-molded posts. Matching nuts and/or washers may be used with posts so as to compress the plates they are adjacent to when in place. If the post is molded, it can be molded separately or in place. If molded in place, in situ, a channel seal may need to be present in the channel to hold the molten plastic in place.

The battery assembly may include one of more heat exchangers. The one or more heat exchangers may function to control a temperature, heat, cool, or a combination thereof a battery assembly. The one or more heat exchangers may control a temperature of a battery assembly from an exterior, interior, or a combination of both. One or more heat exchangers may be located about all or at least a portion of an exterior, an interior, or a combination thereof of the battery assembly. One or more heat exchangers may be affixed to at least a portion of an exterior of a battery assembly, an end plate, a monopolar plate, or a combination thereof. One or more heat exchangers may include one or more active, passive, or both heat exchangers. One or more heat exchangers may include one or more fluid heat exchangers, shell and tube heat exchangers, plate heat exchangers, heat sinks, phase-change heat exchangers, waste heat recovery units, thermoelectric devices ("TED"), the like, or any combination thereof. One or more heat exchangers may be in communication with, located within, adjacent to, or a combination thereof one or more channels. One or more heat exchangers may include one or more tubular members, fluid contained within, one or more channels, or a combination thereof. For example, one or more tubular members located within one or more channels having fluid therethrough may be considered a heat exchanger. One or more fluids may include one or more gases, liquids, or a combination thereof. One or more fluids may include air, water, ammonia, nitrogen, oxygen, neon, hydrogen, helium, refrigerant (e.g., 1,1,1,2-Tetrafluoroethane), alkali metal, heat exchange fluid, electrolyte, the like, or any combination thereof. For example, water may be located within one or more sealed tubular members (e.g., rod sealed at both ends). As another example, air may flow through one or more, at least partially unsealed, tubular members (e.g., tubular member with one or both ends open). As another example, one or more heat sinks may be located at one or both ends of one or more channels, in communication with one or more channels members, or both. One or more heat exchangers (such as a heat sink) located outside of a battery assembly and in communication with one or more channels may be beneficial dissipating heat away from one or more channels and away from the battery assembly. One or more heat exchangers may be located adjacent to a membrane, between a membrane and an end plate, the membrane may be located between the heat exchanger and an end plate, or a combination thereof.

The battery assembly may include or be, at least temporarily, in communication with one or more flow mechanisms. One or more flow mechanisms may be in communication with one or more channels. Communication may be direct or indirect. Direct may mean affixed directly to a channel, such as an opening at an end plate. Indirect may mean via another fluid path to a channel, such as a valve. The one or more flow mechanisms may function to create flow, circulate, evacuate, introduce, or a combination thereof one or more fluids in one or more channels. The one or more flow mechanisms may include one or more vacuums, pumps, fans, valves, the like, or any combination thereof. The one or more flow mechanisms may be temporarily, semi-permanently, or permanently affixed as part of the battery assembly. One of more flow mechanisms may be considered part of or separate from the one or more heat exchangers. The one or more flow mechanisms may be removed, affixed, engaged, turned on, or a combination thereof during one or more steps of preparing a battery assembly, operating a battery assembly, or any combination thereof. The one or more flow mechanisms may be affixed, engaged, turned on, or a combination thereof during curing, evacuating, filling, pickling, forming, drying, thermal control cycling, the like, or a combination thereof.

The battery assembly may include an outer seal. The outer seal may function to seal about an exterior of one or more electrochemical cells, protect exterior edges of one or more electrode plates, isolate one or more electrochemical cells and the liquid electrolyte contained therein, or any combination thereof. An outer seal may include an edge seal, membrane, case, the like, or any combination thereof. An outer seal may be part of or located directly on one or more edges of electrode plates. The edges may be the exterior peripheral surfaces of the frames of the electrode plates. A membrane may be bonded to the edges of the electrode plates, sides of one or more or all sides of the electrode plate stack, or both. The membrane may be a sheet of polymeric material which can seal the edges of the electrode plates and thus seal and isolate the electrochemical cells. The membrane may be a thermoplastic polymer. The membrane may be a thermoplastic polymer that can be melt bonded, vibration welded or molded about the substrates of the monopolar and bipolar plates. A membrane may also function as a case. One or more suitable membranes may be disclosed in PCT Publication WO2013/062623 and U.S. Pat. No. 10,141,598, incorporated herein by reference in its entirety. One or more edge seals may include one or more integrated edge seals. The integrated edge seals may be integral with the one or more electrode plates. One or more suitable edge seals may be disclosed in PCT Publication WO2020/0243093, incorporated herein by reference in its entirety.

The battery assembly may include one or more valves. The one or more valves may function to draw a vacuum from an interior of the battery assembly, fill the battery assembly with an electrolyte, fill or evacuate a fluid from one or more channels, and/or vent the battery assembly during operation. The one or more valves may include for one or more fluids, gasses, or both to flow in a single direction or two opposing directions therethrough. The one or more valves may prevent backflow (e.g., flowing outside of the battery assembly), may allow for backflow, or both. The one or more valves may include a pressure release valve, pressure valve, check valve, fill valve, pop valve, and the like, or any combination thereof. The assembly may contain one or more pressure release valve for one or more of the cells to release pressure if the cell reaches a dangerous internal pressure. Inclusion of one or more pressure release valves may make the battery assembly a valve regulated battery, such as a valve regulated lead acid (VRLA) battery. A pressure release valve may be designed to prevent catastrophic failure in a manner which damages the system the battery is used with. Once a pressure release valve is released the battery is no longer functional. The assembly may contain one or more pressure valves. One or more pressure valves may function to resist backflow (e.g., outside of the battery assembly). The one or more pressure valves may function to open and allow flow therethrough into an interior of the battery assembly. The pressure valve may permit one or more fluids to flow into the battery assembly. Two or more valves may cooperate together. For example, a pressure release valve may cooperate with a pressure valve. One valve may allow for flow into the battery assembly while one valve may allow flow outside of the battery assembly. As an alternative, the battery assembly may only have one valve. The one valve may allow for two-way flow therethrough. If a single valve is employed, it may be a two-way valve, such as a two-way pressure valve. The assemblies disclosed may contain a single check valve which releases pressure from the entire assembly when or before a dangerous pressure is reached. The one or more valves may be connected to and/or in communication with one or more channels formed by one or more openings of an end plate, electrode plate, separator, or any combination thereof. The one or more valves may be in communication with a channel. The battery assembly may include one or more valves as described in US 2014/0349147, incorporated herein by reference.

The battery assembly may include one or more ports. The one or more ports may function to draw a vacuum from an interior of the battery assembly, fill the battery assembly with an electrolyte, fill or evacuate a fluid from one or more channels, and/or vent the battery assembly during operation. The one or more ports may include one or more valves, openings, or both. The one or more ports may be synonymous with or separate from one or more valves. The one or more ports may house or be affixed to one or more valves. One or more ports may allow for flow of one or more fluids and/or gasses therethrough in a single direction or two opposing directions. One or more ports may be permanently plugged (e.g., permanently sealed), temporarily plugged (e.g., temporarily sealed), or both. One or more ports may be sealed with a removable plug, permanent seal (e.g., molded in), one or more valves, one or more posts (e.g., overlapping portion), or a combination thereof. One or more removable plugs may be any plug suitable for maintaining a seal under preparing and operating conditions. For example, a removable plug may have a threaded engagement with a port. One or more ports may include a single port or a plurality of ports. A plurality of ports may include two or more ports. One or more ports may include one or more fill ports, evacuation ports, or both. One or more evacuation ports may be configured to evacuate an evacuate and/or other fluids from an interior of the battery, pull a vacuum, or both. A single port may be both a fill port and an evacuation port. One or more ports may be fill ports while one or more other ports are evacuation ports. One or more ports used during pickling, formation, curing, and/or drying may be permanently and/or temporarily sealed prior to operation (e.g., charging or discharging). One or more ports may be part of or in fluid communication with one or more channels. One or more ends of one or more channels may provide for one or more ports. One or more ports may be part of or in fluid communication with one or more heating, cooling, vent, and/or fill channels. For example, the opening of a channel in an end plate (e.g., monopolar plate) may be a port. One or more ports may be located distanced from and in indirect communication with one or more channels. For example, one or more vent holes in a headspace may be considered a port.

The battery assembly may include one or more terminals. The one or more terminals may function to transmit the electrons generated in the electrochemical cells to a system that utilizes the generated electrons in the form of electricity, such as an external load. The one or more terminals may pass through one or more end plates, one or more electrode plates, a membrane, and/or a case. The one or more terminals may pass through an electrode plate from an end plate to the outside or passing through the side of the case or membrane about the assembly essentially parallel to the plane of the end plates. The terminal matches the polarity of the anode or cathode of the monopolar plate. The cathode of the monopolar plate and the cathodes of one or more of the bipolar plates with a cathode current collector may be connected to independent positive terminals. The anode of the monopolar plate and the anodes of one or more of the bipolar plates with an anode current collector may be connected to independent negative terminals. The cathode current collectors may be connected, and the anode current collectors may be connected in parallel. The individual terminals may be covered in a membrane leaving only a single connected positive and a single connected negative terminal exposed.

The battery assembly may include a headspace. A headspace may allow for one or more or more fluids to be collected for filling, one or more gasses to be collected for venting, or both. A headspace may be formed at one or more sides of the battery assembly. A headspace may be formed as part of or in a manifold. A headspace may be in fluid communication with one or more vents, valves, ports, channels, troughs, openings, or any combination thereof. An exemplary headspace may be found in PCT Publication WO2013/062623, incorporated herein by reference.

The assemblies disclosed may be attached to a load and a circuit is formed which includes the cells. Electrons are flowed to the terminals and to the load, a system using the electricity. This flow is maintained as long as the cells can generate electricity. If the stack of cells becomes fully discharged the battery needs to undergo a charging step before additional use. If the substrate for the bipolar plates contains an electrically conductive material admixture at an operating temperature of the battery assembly that is below its phase transformation temperature, the substrate has an electrically conductive path via the material admixture, between a first surface and an opposing second surface of the substrate, and at a temperature that is above the phase transformation temperature of the conductive material admixture, the electrically conductive material admixture undergoes a phase transformation that disables electrical conductivity via the electrically conductive path. This allows the disabling of the battery before untoward consequences occur. Once a battery is discharged it may be recharged by forming a circuit with a source of electrons. During charging the electrodes change function and the anodes during discharge become cathodes and the cathodes during discharge become anodes. In essence, the electrochemical cells flow electrons and ions in opposite directions as compared to discharge.

Method for Preparing Battery Assembly

The present disclosure relates to a method for preparing the battery assembly according to the teachings of the disclosure. Preparing the battery assembly may include assembling. Preparing the battery assembly may include curing. Preparing the battery assembly may include evacuating. Preparing the battery assembly may include filling. Preparing the battery assembly may include pickling. Preparing the battery assembly may include forming. Preparing the battery assembly may include thermal control cycling. Preparing the battery assembly may include remove lead species. Preparing the battery assembly may including finishing. Preparing the battery assembly may include charging. Preparing the battery assembly may include discharging. Preparing the battery assembly may include draining. Preparing the battery assembly may include one, some, or all of these steps.

One or more of these steps may occur sequentially, simultaneously, repeatedly, or any combination thereof. Some of these steps may be substeps of one another. One or more of these steps may not be performed. One or more of these steps may be repeated. For example, one or more steps may include both evacuating and filling. As another example, evacuating and filling may be part of thermal control cycling. As another example, thermal control cycling may be part of curing, pickling, forming, drying, the like, or a combination thereof.

The method for preparing the battery assembly may include one or more of assembling, curing, drying, evacuating, filling, pickling, forming, thermal control cycling, charging, discharging, removing lead species, finishing, draining, the like, or any combination thereof. One or more of these steps may occur sequentially, simultaneously, repeatedly, or any combination thereof. One or more of these steps may not be performed. One or more of these steps may be repeated.

One or more fluids may flow through the battery assembly while preparing, after preparing, during operation, after operation, or any combination thereof. One or more fluids may flow within the battery assembly during evacuating, filling, curing, drying, pickling, forming, thermal control cycling, removing lead species, charging, discharging, the like, or a combination thereof. The one or more fluids may include the one or more fluids as described hereinbefore. One or more fluids may include electrolyte, air, drying fluids, lead collection fluids, reactive materials, electrolyte removal fluids, the like, or a combination thereof. The one or more fluids may include one or more reactive materials. The reactive materials may flow through the channels, troughs, or both during one or more stages of preparing and operating the battery assembly. The stages may include evacuating, filling, curing, drying, pickling, forming, thermal control cycling, removing lead species, the like, or a combination thereof.

Preparing a battery assembly may be able to completed at one, or mostly one, workstation. More than one step of preparing a battery assembly may be able to be completed at a single workstation. A workstation may refer to a workstation configured for one employee, that all equipment is affixed to, or both. A single workstation may include all equipment for preparing a battery assembly. A single workstation may include all equipment for assembling, curing, evacuating, filling, pickling, forming, drying, initially charging before operation, the like, or a combination thereof. As curing ovens, water baths, or both may be avoided, it may be feasible to complete all if not most of the preparing at the same workstation. A pasting process may be completed prior to the workstation, integrated at the workstation, or both.

Assembling

The method for preparing a battery assembly may include assembling a battery assembly. Assembling may create the structure of the battery assembly prior to being electrochemically active. Assembling may include forming one or more electrode plates, forming an electrode plate stack, compressing the electrode plate stack, applying an outer seal, the like, or a combination thereof. Compressing and applying may occur before, during, and/or after curing, during, pickling, forming, or a combination thereof.

Assembling a battery assembly may include forming one or more electrode plates. Forming one or more electrode plates may create one or more electrodes useful within the battery assembly. Forming one or more electrode plates may include forming one or more substrates, frames, or both. Forming one or more electrode plates may include forming one or more troughs as part of the electrode plate, separator, or both. Forming one or more electrode plates may include locating one or more conductive materials in one or more conductive openings, placement of one or more current collectors on a substrate, or both. Forming one or more electrode plates may include locating one or more active materials on one or both surfaces of a substrate. The one or more active materials may be pasted onto the substrate. The one or more active materials may be applied via the application processes of PCT Publication Nos. WO 2018/213730 and WO 2020/102677, incorporated herein by reference in their entirety. Forming of an electrode plate may include applying a separator. One or more active materials may be disposed on a separator prior to being located onto the substrate. In the alternative, or in addition to, one or more separators may be stacked in between electrode plates while forming an electrode plate stack.

Assembling may include forming an electrode plate stack. Forming an electrode plate stack may include aligning and stacking a plurality of electrode plates to form one or more electrochemical cells therebetween. One or more separators may be located between each pair of electrode plates. The separators may be located on an electrode plate during forming of the plate. The separators may be located between cells during stacking. While aligning and stacking the plurality of electrode plates, the electrode plates and separators may be stacked in an alternating arrangement. One or more frames, inserts, or both of one or more electrode plates may align and/or interlock with one or more frames, inserts, or both of adjacent electrode plates and/or separators. A peripheral surface of the one or more frames may form part of an exterior surface of the electrode plate stack. Alignment and interlocking of a plurality of inserts may form one or more channels.

Assembling may include compressing an electrode plate stack. Compressing may allow for one or more seals to be maintained about one or more electrochemical cells, channels, or both; resist expansion during operation; resist buckling during filling with an electrolyte or evacuating; or any combination thereof. Compressing may include locating and/or forming one or more posts within one or more channels. Compressing may include forming one or more overlapping portions of one or more posts such as to apply a compressive force to one or more end plates and/or monopolar plates. Compression may apply compressive force with one or more interlocking features, such frames, inserts, the like, or a combination thereof. For example, one or more shafts may be inserted into the one or more channels and then secured in place by located one or more heads thereon. As another example, one or more used posts may have been made of a thermoplastic material which is melted during and/or after removal from a used battery assembly and then melt bonded into the one or more channels of the battery assembly.

Assembling the battery assembly may include applying an outer seal. Application of an outer seal may include or be free of forming an integrated seal, applying a membrane, inserting the electrode plate stack into a case, or a combination thereof Curing A method for preparing a battery assembly include curing one or more materials. Curing may function to allow one or more materials to be in their final state, sufficiently harden, be useful for operation of the battery, and/or the like. Curing of one or more materials may occur prior to, during, and/or after assembling an electrode plate stack, filling, pickling, forming, or a combination thereof. For example, curing of one or more active materials may occur after forming the electrode plate and after forming the electrode plate stack, or both. As another example, curing of one or more active materials may occur after forming the electrode plate and before forming the electrode plate stack. Even as another example, curing may occur after formation. The method may be free of curing.

Curing may involve a typical curing oven process. For a typical curing oven process, after applying one or more active materials to one or more substrates, an electrode plate may be inserted into and exposed to raised temperatures of a curing oven.

Curing may involve filling and/or evacuating. Curing may be able to take place after an electrode plate stack is formed based on the advantages of fluid flow throughout the battery assembly. Curing may occur when one or more fluids are circulated through the battery assembly. Circulating may include fluid flow through one or more valves, ports, vents, openings, channels, troughs, electrochemical cells, the like, or a combination thereof. Circulating may involve repeatedly filling and evacuating one or more fluids, simultaneously filling and evacuating one or more fluids, or both. Evacuating and filling may occur as disclosed hereinafter. During curing, one or more fluids may flow through one or more channels, troughs, electrochemical cells, or a combination thereof. One or more fluids for curing may include air, drying fluids, or both. Air may be particularly useful for curing. It may be advantageous to pass dry air, humid air, or both during curing. Humid air may be circulated through the battery assembly prior to dry air. Dry air may be circulated through the battery assembly prior to humid air. Humid air and dry air may simultaneously be circulated through the battery assembly.

During curing one or more materials may be exposed to increased temperatures. The increased temperatures may aid in expediting the curing over ambient temperature. The increased temperature may raise an internal temperature of the battery assembly to cure one or more active materials and/or other materials. The temperature of fluid flowing through the battery assembly during curing may be about 35° C. or higher, about 40° C. or higher, about 50° C. or higher, about 60° C. or higher. The temperature of fluid flowing through the battery assembly during curing may be about 100° C. or less, about 90° C. or less, about 80° C. or less, or even about 70° C. or less. For example, the increased temperatures may be about 50° C. or higher to about 80° C. or less. The temperature of fluid flowing through the battery assembly may be the temperature of the one or more fluids circulating through the battery assembly during curing. As an example, the temperature may refer to the temperature of air circulating through the battery assembly during curing.

Evacuating

A method for preparing a battery assembly may include evacuating. Evacuating may function to evacuate one or more fluids from an interior of the battery, allow for filling of fluids under a vacuum, allow for replacing one or more fluids with other fluids, allow for filling to be expedited, or any combination thereof. Evacuating may include drawing a vacuum, displacing one or more fluids, pulling one or more fluids, draining one or more fluids, or a combination thereof.

Evacuating to draw a vacuum may create a lower pressure in an interior of the battery assembly than the ambient environment about the battery assembly (e.g., atmospheric pressure). Evacuating to displace or drain one or more fluids may create space for one or more other fluids fill. Evacuating may draw one or more fluids from one or more channels, troughs, electrochemical cells, openings, ports, vents, valves, the like, or any combination thereof. Evacuating may draw one or more fluids from one or more channels sealed from one or more electrochemical cells. For example, one or more heating and/or cooling channels. Evacuating may drawing one or more fluids from one or more channels, troughs, or both in fluid communication with one or more electrochemical cells. For example, one or more fill and/or vent channels. For example, one or more troughs in fluid communication with one or more fill and/or vent channels.

Evacuating may remove one or more fluids from an interior of the battery assembly. Fluids may include one or more liquids, gasses, or both. One or more fluids may include electrolyte, air, drying fluids, lead collection fluids, reactive materials, electrolyte removal fluids, the like, or a combination thereof.

Evacuating may be part of, completed before, completed during, and/or completed after assembling, filling, pickling, forming, thermal cycling, curing, drying, charging, discharging, the like, or any combination thereof. Evacuating may be completed at the same or a different workstation as assembling, filling, pickling, forming, curing, drying, charging, or any combination thereof.

Evacuating may include flowing one or more fluids into one or more ports from one or more vents, into one or more ports from one or more channels, into one or more vents from one or more channels, into one or more channels and/or vents from one or more openings, into one or more channels and/or vents from one or more troughs, or a combination thereof. Filling may include flowing one or more fluids into one or more channels from one or more inlet troughs, into one or more channels from one or more main troughs, into one or more channels from one or more branching troughs, into one or more inlet troughs from one or more main troughs, into one or more main troughs from one or more branching throughs, into one or more inlet troughs from one or more branching troughs, the like, or a combination thereof. Evacuation may include flowing one or more fluids in a reverse flow filling.

Evacuating may utilize one or more flow mechanisms. One or more flow mechanisms may be affixed, engaged, and/or turned on to initiate evacuation. One or more flow mechanisms may be directly and/or indirectly affixed to one or more valves, ports, openings, channels, the like or a combination thereof. One or more flow mechanisms may include one or more fluid flow lines.

Evacuating may include affixing one or more fluid flow lines to one or more valves, ports, openings, channels, or a combination thereof. The one or more fluid flow lines may be suitable for the one or more fluids being transferred therein.

Evacuating may be completed via one or more heating, cooling, fill, and/or vent channels. Evacuating may be completed as the same or different port as used for filling. Evacuating may occur through an evacuation port while filling may occur through a fill port. Evacuating may occur through a port used as both an evacuation port and fill port.

Evacuating may include evacuating one or more initial fluids before replacing (e.g., filling) with one or more other fluids. Evacuating may include evacuating one or more fluids used during curing prior to filling. Evacuating may include evacuating one or more electrolytes used during pickling and/or forming before filling with an electrolyte for operation.

Evacuating may be partial and/or complete. Partial may mean only a portion of the one or more fluids are evacuated and removed from the interior of the battery assembly. Complete may mean substantially all of one or more fluids are evacuated and removed from the interior of the battery assembly.

Filling

A method for preparing a battery assembly may include filling. Filling may function to initially fill one or more electrochemical cells with one or more fluids, allow one or more fluids (e.g., electrolyte) to begin wicking into one or more separators, replace one or more fluids, flow fluids through the battery assembly, or any combination thereof. Filling may include flowing one or more interim fluids, permanent fluids, or both into the interior of the battery assembly. Interim fluids may include one or more fluids used during preparing the battery assembly, not intended to be within the battery during operation, or both. Permanent fluids may still be removable. Permanent fluids may include one or more operating fluids. Operating fluids may be the fluids located within the battery assembly during operation (e.g., attached to a load). Filling may include flowing one or more fluids through one or more ports, valves, vents, channels, troughs, openings or a combination thereof; at least partially or completely filling one or more electrochemical cells with one or more fluids; displacing one or more fluids with one or more other fluids; or any combination thereof.

Filling may include flowing one or more fluids through one or more ports into one or more vents, from one or more ports into one or more channels, from one or more vents into one or more channels, from one or more channels and/or vents into one or more openings, from one or more channels and/or vents into one or more troughs, or a combination thereof. Filling may include flowing one or more fluids from one or more channels into one or more inlet troughs, from one or more channels into one or more main troughs, from one or more channels into one or more branching troughs, from one or more inlet troughs to one or more main troughs, from one or more main troughs to one or more branching throughs, from one or more inlet troughs to one or more branching troughs, the like, or a combination thereof.

Filling may be part of, completed before, completed during, and/or completed after assembling, evacuating, pickling, forming, thermal cycling, curing, drying, charging, discharging, the like, or any combination thereof. Filling may be completed at the same or a different workstation as assembling, evacuating, pickling, forming, curing, drying, charging, or any combination thereof.

Filling may include flowing one or more fluids into an interior of the battery assembly. Fluids may include one or more liquids, gasses, or both. One or more fluids may include electrolyte, air, drying fluids, lead collection fluids, reactive materials, electrolyte removal fluids, the like, or a combination thereof.

Filling may include filling the battery assembly with one or more fluids while an interior of the battery assembly is at atmospheric pressure.

Filling may occur under a vacuum. Filling may include filling the battery assembly with one or more fluids while an interior of the battery assembly below atmospheric pressure. Below atmospheric pressure may be completed by evacuating. Below atmospheric pressure may be considered filling under a vacuum. Vacuum may include under a vacuum chamber, separate ports for simultaneously drawing a vacuum while filling with one or more fluids, utilizing a single port as a vacuum port (e.g., evacuation portion) and a fill port, the like, or any combination thereof. Exemplary solutions for filling the battery assembly with electrolyte under a vacuum are disclosed in US Publication Nos. 2014/0349147 and 2017/0077545, incorporated herein by reference in their entirety.

During filling the one or more fluids may partially or completely fill the electrochemical cells. The one or more fluids may include a liquid electrolyte. The electrolyte during the filling step may fill the voids (e.g., open space, pores, and the like) in the electrochemical cells. The one or more fluids may fill the cells such that the cells are 60% full or greater, 70% full or greater, or even 80% or greater. The one or more fluids may fill the cells such that the cells are 100% full or less, 95% full or less, or even 90% or less. For example, an initial filling step may fill the electrochemical cells of the battery assembly to be 90% full.

Electrolyte used during the filling step may be below, at, or above ambient temperature. Electrolyte may be chilled. Chilled may mean below ambient temperature, below an internal temperature of the battery, or both. For example, chilled may be both below or at ambient temperature and below an internal temperature of the battery. As another example, chilled may be above ambient temperature but below an internal temperature of the battery. The used of chilled electrolyte may assist in thermal control of subsequent exothermic reactions during the pickling and formation steps. For example, during pickling and/or formation, an exothermic reaction may heat the chilled electrolyte to ambient temperature or higher. Chilled electrolyte may be at a temperature of about 0° C. or greater, about 2° C. or greater, or even about 5° C. or greater. Chilled electrolyte may be at a temperature of about 50° C. or less, about 40° C. or less, about 30° C. or less, about 25° C. or less, about 20° C. or less, about 15° C. or less, or even about 10° C. or less. Upon entering an electrochemical cell, the electrolyte may begin to wick (e.g., be absorbed) into the one or more separators. The process of wicking may also be referred to as absorption, soaking, and the like. The filling process may include the electrolyte being guided via one or more troughs of the one or more separators. After the initial filling step, a pickling process may occur.

Filling may utilize one or more flow mechanisms. One or more flow mechanisms may be affixed, engaged, and/or turned on to initiate filling. The one or more flow mechanisms may be the same or separate from the one or more flow mechanisms used for evacuating. One or more flow mechanisms may be directly and/or indirectly affixed to one or more valves, ports, openings, channels, the like or a combination thereof. One or more flow mechanisms may be affixed to the same or a different opening, port, and/or valve for filling as one or more flow mechanisms are attached to for evacuating. One or more flow mechanisms useful for evacuating may be removed or remain in place during filling. One or more flow mechanisms may include one or more fluid flow lines.

Filling may include affixing one or more fluid flow lines to one or more valves, ports, openings, channels, or a combination thereof. Filling may involve leaving one or more fluid flow lines in place. For example, one or more fluid flow lines used for evacuation may be used for filling. As another example, one or more different fluid flow lines may be used for filling as evacuation. The one or more fluid flow lines may be suitable for the one or more fluids being transferred therein.

Pickling

A method for preparing a battery assembly may include pickling. Pickling may function to boost performance of the battery assembly; prolong the life and/or improve performance of one or more active materials of the battery assembly; expediting curing of one or more active materials; or a combination thereof. Pickling may include adding one or more reactants to the battery assembly. The one or more reactants may be added to the electrolyte, one or more active materials, electrochemical cells, separators, or a combination thereof. The one or more reactants may be added before, during, or after an assembly step, filling step, or both. As an example, the one or more reactants may be mixed with the electrolyte before the filling step, such that both the reactant and electrolyte fill the electrochemical cells simultaneously. As another example, a reactant may be applied onto the one or more active materials before the electrolyte fills the electrochemical cells. Such as, one or more electrode plates with one or more active materials thereon may be dipped in a performance additive, have the reactant applied thereon, or both. Pickling may occur before, during, or after curing and/or drying of one or more active materials.

The pickling process may be exothermic. The pickling process may heat one or more fluids within the battery assembly. The pickling process may heat the electrolyte to a temperature above the initial filling temperature, closer or equal to an internal temperature of the battery, or both. During pickling, the electrolyte may be heated to a temperature above ambient temperature. Electrolyte heated by the internal temperature of a battery may be considered warmed electrolyte. The exothermic reaction may be beneficial in expediting curing of one or more active materials. The exothermic reaction may occur between one or more active materials and one or more reactants. The exothermic reaction may result in one or more hydrates.

For example, tetrabasic lead sulfate or tribasic lead sulfate (e.g., active material) may have an exothermic reaction with sulfuric acid (e.g., reactant), the reaction may result in a product of a lead sulfate compound and a hydrate compound. Exemplary reaction equations may be:

$$\text{Tetrabasic pickling reaction: } (PbO)_4PbSO4 + 4H_2SO_4 \rightarrow 5PbSO_4 + 4H_2O$$

$$\text{Tribasic pickling reaction: } (PbO)_3PbSO4 + 3H_2SO_4 \rightarrow 4PbSO_4 + 3H_2O$$

During the pickling process, temperature cycling may aid in controlling the battery assembly. Temperature cycling may occur through thermal control cycling. For example, if the pickling process occurs after the battery assembly is assembled together and filled with electrolyte, a thermal control cycling process may occur at the same time, after, or both the pickling process. The pickling process may occur without an electric charge applied to the battery assembly. Applying a charge may initiate formation. Formation may occur after the initial pickling process is complete. The initial pickling process may be complete when the reaction between one or more active materials and one or more reactants is completed, such as before a charge is applied.

The method for preparing a battery assembly may also be free of pickling. Eliminating a pickling process may provide for a substantial time-savings in preparing the battery assembly. One or more active materials may be selected such as to avoid the need for pickling while still providing for performance and longevity of the battery assembly.

Pickling may include one or more fluids circulating therethrough. One or more fluids may be circulated during thermal control cycling. The one or more fluids may be referred to as pickling fluids. Thermal control cycling may include evacuating one or more fluids from the battery assembly, filling the battery assembly with one or more fluids, or both. One or more fluids may include one or more fluids described herein. For example, the one or more fluids may include electrolyte. As a further example, during pickling, one or more pickling fluids may include a diluted electrolyte.

Forming

A method for preparing a battery assembly may including forming. Forming (also referred to as formation) may function to cure one or more active materials, charge one or more electrode plates, yield subsequent pickling, or any combination thereof. Formation may include applying a charge to one or more electrode plates, the battery assembly, or both. The charge may be applied to the battery assembly as disclosed herein. For example, via a pair of conductive terminals. Formation may be endothermic, exothermic, or both. Formation may include a reaction between the electric charge, the active material, and one or more products from the pickling process. For example, formation may include a reaction between an electric charge, a lead sulfate compound, and a hydrate compound. The formation reaction may result in one or more products. The one or more products may include one or more reactants that initiate a subsequent pickling process.

For example, the one or more products may include lead sulfate, one or more sulfuric acid compounds, and additional lead. An exemplary formation reaction equation may be:

$$e^- + 2PbSO_4 + 2H_2O \rightarrow PbO_2 + 2H_2SO_4 + Pb(m)$$

The formation reaction resulting in one or more products having one or more reactants may be the endothermic portion of the formation step. Once the formation has produced a sufficient resulting product (e.g., the reactant), a subsequent pickling process may commence. Additionally, during formation, Joule heating may occur due to internal resistance. This Joule heating may also contribute to elevated temperatures during formation. Before, during, and/or after both formation and/or pickling, thermal control cycling may occur.

Forming may include one or more fluids circulating therethrough. One or more fluids may be circulated during thermal control cycling. Thermal control cycling may include evacuating one or more fluids from the battery assembly, filling the battery assembly with one or more fluids, or both. One or more fluids may include one or more fluids described herein. The one or more fluids may be forming fluids. For example, the one or more fluids may include electrolyte. As a further example, during forming, one or more forming fluids may include a diluted electrolyte.

Forming may be free of using a fill and/or formation tank. Avoiding the use of a tank may be beneficial in reducing the workspace needed to prepare a battery assembly. Formation may be able to occur at the same workstation as curing, evacuating, filling, pickling, thermal cycling, charging, draining, lead evacuation, the like, or a combination thereof. Elimination of a tank may be made possible via fluid circulation through the battery assembly, thermal control cycling, evacuating, filling, and the like as disclosed herein.

Thermal Control Cycling

A method of preparing a battery assembly may include thermal control cycling. Thermal control cycling may function to control the temperature of the battery assembly during exothermic reactions; during pickling, formation, curing, drying, charging, and/or discharging; or any combination thereof.

Thermal control cycling may be part of, concurrent with, completed before, completed during, and/or completed after evacuating, filling, pickling, forming, curing, drying, charging, discharging, the like, or any combination thereof. Thermal control cycling may be completed at the same or a different workstation as assembling, evacuating, filling, pickling, forming, curing, drying, charging, or any combination thereof.

The one or more thermal control cycling processes may function to maintain the interior temperature of the battery assembly above, at, and/or or below a threshold temperature. A threshold temperature may be a temperature at which unsafe operating conditions may be created, such as excess pressure and/or heat. Unsafe conditions may be those conditions that result in the battery assembly bulging, bubbling, short circuiting, and the like. A threshold temperature may be a temperature at which one or more active materials are cured over a period of time. A threshold temperature may be a temperature at which one or more materials are dried over a period of time. A threshold temperature may refer to an internal temperature of the battery assembly. The internal temperature may be a temperature of the one or more electrochemical cells, channels, electrolyte within the battery assembly, the like, or a combination thereof. A threshold temperature may be about 35° C. or greater, about 40° C. or greater, about 50° C. or greater. A threshold temperature may be about 100° C. or less, about 90° C. or less, about 80° C. or less, about 70° C. or less, or even about 60° C. or less.

Thermal control cycling may include fluid cycling, external water baths, heat blankets, the like, or any combination thereof.

Fluid cycling may include circulating of one or more fluids through the battery assembly. Fluid cycling may include one or more repetitions of evacuating, filling, or both. Evacuating and/or filling may occur as disclosed herein. Fluid cycling may include one or more repetitions of partial evacuating, complete evacuating, partial filling, complete filling, or a combination thereof. Fluid cycling may include exchanging one or more fluids for one or more other fluids. The one or more other fluids may be the same or different fluids. Different fluids may include a first fluid and a second fluids. Fluid cycling may include flowing separate fluids separate from one another through the battery assembly. Separate may mean that the fluids may mix together or may not come into contact one another. For example, one or more fluids may flow through one or more fill and/or vent channels into one or more electrochemical cells while one or more other fluids flow through one or more heating/cooling channels sealed and isolated from the electrochemical cells. Different or same fluids may be used within the same or different steps of the battery preparation process. For example, one or more pickling fluids may be the same as one or more forming fluids. As another example, air may be used during curing while pickling and/or forming fluids, such as electrolyte, are used during pickling and/or forming. As another example, air and/or drying fluids may be used during drying while electrolyte is used during pickling, forming, and/or final fill before operation.

Thermal control cycling may include electrolyte cycling. Electrolyte cycling may function to provide an internal heat sink, remove and/or add heated electrolyte, maintain the battery assembly at or below the threshold temperature from within an interior of the battery assembly, or any combination thereof. Electrolyte cycling may include partially evacuating, completely evacuating, partially filling, completely filling the battery assembly of electrolyte. Electrolyte cycling may, at least partially replace, some electrolyte with other electrolyte. Thermal control cycling includes evacuation of an initial or previous electrolyte and replacing with a subsequent electrolyte. Evacuation and filling may refer to the electrochemical cells and their available volume for holding electrolyte.

Evacuating may include evacuating warmed electrolyte. Warmed electrolyte may be electrolyte exposed to any exothermic reactions or other heating occurring within the battery assembly. For example, warmed electrolyte may result from pickling, forming, or both. Warmed electrolyte may be partially or completely evacuated during thermal control cycling.

Evacuating during thermal control cycling may include reducing how full each electrochemical cell is with electrolyte. After evacuation, each electrochemical cell may be about 50% full or greater, 60% full or greater, or even 70% full or greater with electrolyte. After evacuation, each electrochemical cell may be about 95% full or less, about 90% full or less, or even about 80% full or less with electrolyte.

Filling during thermal control cycling may include filling with electrolyte. The electrolyte may be chilled electrolyte, warmed electrolyte, or both. Filling may include partially or completely replacing an evacuated electrolyte with a chilled electrolyte, warmed electrolyte, or both. Filling may include partially or completely replacing evacuated electrolyte with electrolyte at or below a temperature of the evacuated electrolyte.

Filling may include filling below, the same, or greater than the initial filling level. Filling may include replacing the evacuated electrolyte at, below, or above a 1:1 ratio.

A partial evacuation and/or filling may take about 5 seconds or greater, about 10 seconds or greater, or even about 20 seconds or greater. A partial evacuation and/or filling may take about 2 minutes or less, 1 minute or less, or even about 30 seconds or less. A partial evacuation may take less, about equal, or even more time than a partial filling of the same volume of electrolyte.

Thermal control cycling may repeat until the pickling, formation, curing, drying, or a combination thereof are complete. Thermal control cycling may repeat 1 or more times, 2 or more times, or even 3 or more times. Thermal control cycling may repeat 10 or less times, 7 or less times, or even 5 or less times. Thermal control cycling may repeat as necessary depending on the size of the battery assembly and how long the pickling and/or formation processes may last.

During thermal control cycling, the filling electrolyte may differ than the evacuated electrolyte. For example, the chilled electrolyte replacing the evacuated warmed electrolyte may have a higher specific gravity. The initial electrolyte may have a lower specific gravity than a subsequent electrolyte. The initial electrolyte may refer to the electrolyte used for the first fill, prior to pickling and/or forming, or the electrolyte used during any processes occurring to operation of the battery assembly.

The above teachings with respect to electrolyte and electrolyte cycling, may also be used with respect to any other fluids. For example, there may be air cycling during curing. There may be air and/or drying fluid cycling during drying. Drying A method for preparing a battery assembly may include drying one or more materials. Drying may allow for a battery assembly to be stored for long-term storage, transportation of a battery, flow of one or more fluids therethrough, or any combination thereof. Drying a battery assembly may extend the shelf life. Drying a battery assembly may provide for a dry charge battery. Drying may occur after curing, pickling, forming, draining, evacuating, lead evacuation, or any combination thereof. For example, drying may occur after formation. As another example, drying may occur after curing. After drying, the battery assembly may be finished so as to seal off any ports and/or valves.

Drying may function to dry one or more materials within an interior of the battery assembly. The one or more materials may include the active material, separator, substrate, channel surfaces passing through the electrochemical cells, troughs, channels, vents, ports, valves, the like, or any combination thereof. Drying may function to remove one or more fluids anywhere between the electrochemical cells to a port, valve, or other exit and/or entry into the interior of the battery assembly. The one or more fluids may include a liquid electrolyte, water, the like, or a combination thereof. Drying may occur after draining and/or evacuating. Drying may occur before and/or after flushing with one or more liquids. For example, drying may occur after evacuating (e.g., draining) the liquid electrolyte from the battery assembly and then flushing (e.g., filling then evacuating) with water.

Drying may involve filling and/or evacuating. Drying may occur when one or more fluids are circulated through the battery assembly. Circulating may involve repeatedly filling and evacuating one or more fluids, simultaneously filling and evacuating one or more fluids, or both. Evacuating and filling may occur as disclosed herein. During drying, one or more fluids may flow through one or more channels, troughs, electrochemical cells, or a combination thereof. One or more fluids may include drying fluids. One or more drying fluids may be particularly useful for circulating therethrough during drying. Dry air may be particularly useful for circulating during drying. One or more other drying fluids may be circulated before the dry air.

Drying may include one or more fluids circulating therethrough. One or more fluids may be circulated during thermal control cycling. Thermal control cycling may include evacuating one or more fluids from the battery assembly, filling the battery assembly with one or more fluids, or both. One or more fluids may include one or more fluids described herein. The one or more fluids may be drying fluids, air, lead collection fluids, the like, or a combination thereof. Finishing The method for preparing the battery assembling may include finishing. Finishing may involve sealing any ports and/or valves used during curing evacuating, filling, pick-ling, forming, thermal cycling, drying, the like, or a com-bination thereof. Finishing may include installing one or more seals at one or more ports. The one or more seals may be permanently and/or temporarily located in the port. One or more ports may be sealed with a removable plug, per-manent seal (e.g., molded in), one or more valves, one or more posts (e.g., overlapping portion), or a combination thereof. Finishing may include plugging one or more fill ports. Plugging one or more fill ports may occur after formation is complete. Finishing may occur permanently and/or temporarily after any of the steps in preparing the battery assembly.

Removing Lead Species

The method for preparing a battery assembly may include removing one or more lead species. Removing one or more lead species may function to extend the life of a battery assembly, collect recyclable components of a battery assem-bly, or both. Lead species may be created during operation, during discharging of the battery, or both. Lead species may be created within the one or more electrochemical cells during the electrochemical reactions of the cells. Lead species may include lead sulfate. Discharging may include discharging during operation. Removing lead species may include completely discharging, evacuating, and filling.

Removing lead species may include evacuating one or more fluids from a battery assembly. The battery assembly may be a used battery assembly. Used may mean that the battery assembly has undergone one or more charging and discharging cycles. The one or more fluids may include electrolyte from the battery assembly. Evacuating may include any of the process steps as discussed herein with respect to evacuation.

Removing lead species may include flowing one or more lead collection fluids through the battery assembly. Lead collection fluids may function to collect one or more lead species while flowing through the battery assembly. Flowing may include circulating through one or more channels, troughs, openings, vents, ports, valves, the like, or a com-bination thereof. Flowing one or more lead collection fluids may be completed similar as to the filling and thermal control cycling processes as discussed herein. The one or more lead collection fluids may be added before, after, or simultaneous with evacuating. For example, the one or more lead collection fluids may be mixed with the already used electrolyte. As an example, the used electrolyte may first be partially evacuated and then the lead collection fluids mixed with the remaining electrolyte. As another example, the used electrolyte may be completely evacuated, and the lead collection fluids may then be flowed into the electrochemical cells.

Upon the one or more lead collection fluids collecting the one or more lead species, the lead collection fluids may be removed from the battery assembly. This removal may aid in removing the lead species, such as lead sulfate.

Upon removing the lead collection fluid, the battery assembly may undergo evacuating and/or filling with fresh electrolyte. After being refilled, the battery assembly may be reused.

Upon removing the lead collection fluid, the battery assembly may be discarded. Discarding may include recy-cling, reprocessing, or the like.

Draining Used Electrolyte

The method for preparing a battery assembly may include draining used electrolyte. Draining used electrolyte may allow for the electrolyte to be collected, recycled, or both. Draining the used electrolyte may occur with evacuating, filling, or both. The battery assembly may be evacuated to collect the electrolyte. The battery assembly may be filled with one or fluids to collect the electrolyte. One or more fluids may displace the electrolyte, such that the electrolyte is able to be collected. The used electrolyte may flow through one or more ports and/or valves.

Draining may utilize one or more flow mechanisms. One or more flow mechanisms may be affixed, engaged, and/or turned on to initiate draining. The one or more flow mecha-nisms may be the same or separate from the one or more flow mechanisms used for evacuating, filling, or both. One or more flow mechanisms may be directly and/or indirectly affixed to one or more valves, ports, openings, channels, the like or a combination thereof. One or more flow mechanisms may be affixed to the same or a different opening, port, and/or valve for filling as one or more flow mechanisms are attached to for evacuating, filling, or both. One or more flow mechanisms useful for evacuating and/or filling may be removed or remain in place during draining. One or more flow mechanisms may include one or more fluid flow lines.

Draining may include affixing one or more fluid flow lines to one or more valves, ports, openings, channels, or a combination thereof. Draining may involve leaving one or more fluid flow lines in place. For example, one or more fluid flow lines used for evacuation and/or filling may be used for draining. As another example, one or more different fluid flow lines may be used for draining as evacuation and/or filling. The one or more fluid flow lines may be suitable for the one or more fluids being transferred therein.

Illustrative Examples

The following descriptions of the Figures are provided to illustrate the teachings herein but are not intended to limit the scope thereof. Features of any one embodiment may be employed in another. For example, any combination of troughs from FIGS. 1-3 can be combined with one another.

Figure 6:
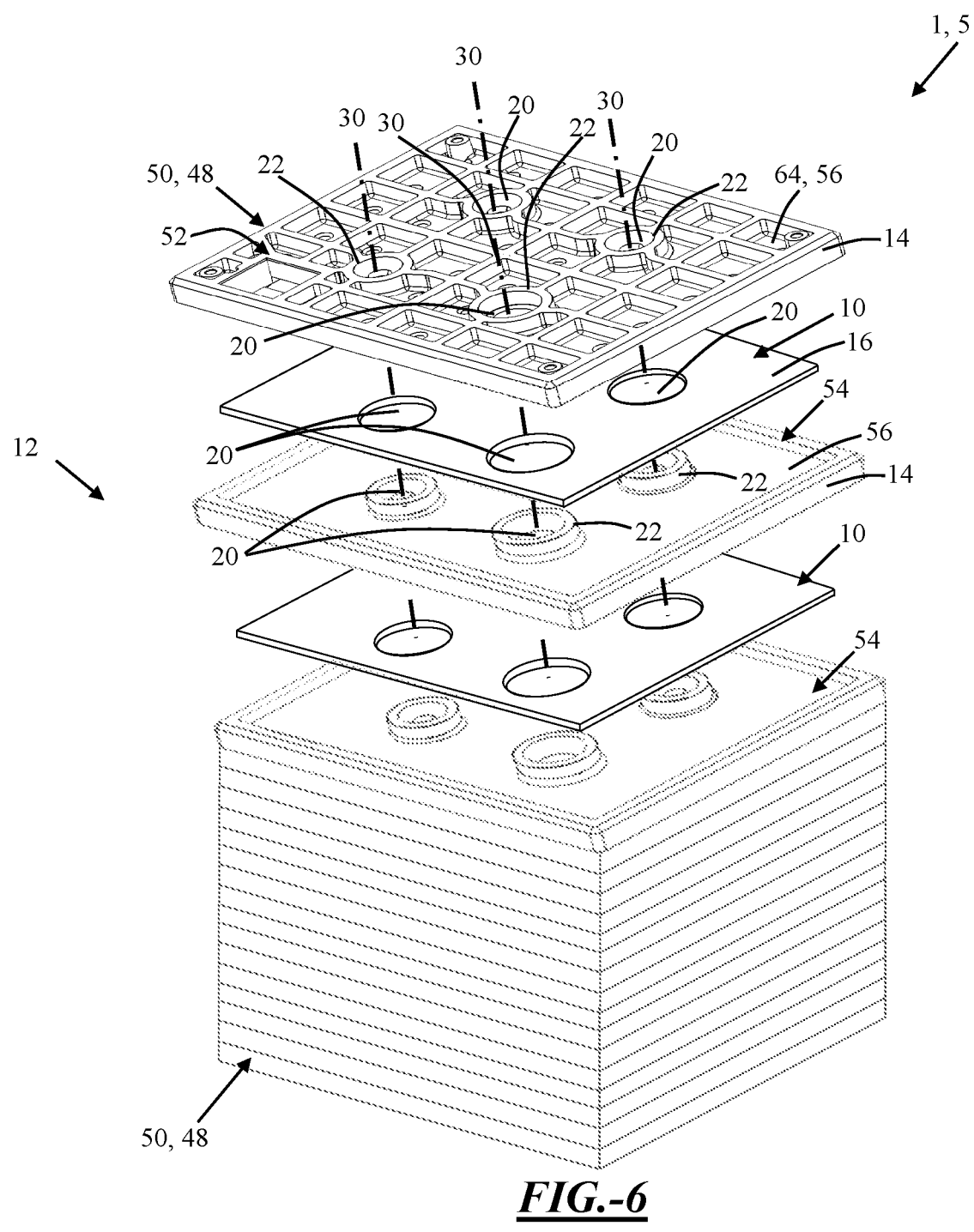
FIG. 6 illustrates a partially exploded stack of electrode plates and separators of a battery assembly.

FIG. 1 illustrates a cross-section of a stack 5 of electrode plates 12 which form, at least part of, a battery assembly 1. The cross-section of the battery assembly 1 is taken as to expose a separator 10. The separator 10 is located within a formed stack 5 of electrode plates 12. A plurality of sepa-rators 10 are alternatingly stacked with the plurality of electrode plates 12. The separator 10 rests within the frame 14 of an adjacent electrode plate 12. It is also envisioned that a frame 14 could be part of the separator 10, as illustrated in FIG. 6. The separator 10 is in the form of a sheet 16. The sheet 16 may be an absorbent glass mat 18. The separator 10 includes a plurality of openings 20. The openings 20 may form part of or have one or more transverse channels 30 extending therethrough. The openings 20 of the separator 10 include inserts 22 extending therethrough. The inserts 22 are part of and extend from an adjacent electrode plate 12. Some of the openings 20 include one or more posts 24 located therethrough. The posts 24 may pass through openings 20 of the inserts 22, as well as openings 20 of the separator 10. The openings 20, of the separator 10 and/or the inserts 22, including one or more posts 24 therein may be referred to a support openings 36. The support openings 36 may be part of one or more support channels 38 (not shown). One or more of the inserts 22 include a vent 26 formed therein. The vent 26 is in fluid communication with the opening 20. Openings 20 which are free from one or more posts 24 may be referred to as fill openings 28. The fill openings 28 may be part of one or more fill channels 32 (not shown). The separator 10 further includes a plurality of troughs 34 formed therein. The troughs 34 are in fluid communication with one another and with a fill opening 28. The troughs 34 run between a plurality of openings 20. The troughs 34 are formed such that the sheet 16 has a lesser thickness at the troughs 34 than compared to the remainder of the sheet 16.

FIG. 2 illustrates an electrode plate 12. The electrode plate 12 includes a substrate 56. The substrate 56 includes a frame 14 about its periphery. The frame 14 projects from the substrate 56. The frame 14 is integral with the substrate 56. The substrate 56 includes inserts 22 projecting therefrom. The substrate 56 includes inserts 22 projecting therefrom. The inserts 22 include openings 20. The openings 20 of the inserts 22 pass through the insert 22 and the substrate 56. The inserts 22 project through openings 20 of the separator 10 and active material 60. Openings 20 are formed as voids 58 in the one or more active materials 60 and separator 10. The separator 10 can also be a transfer sheet 62 (as shown) or used in conjunction (e.g., layered with) a transfer sheet 62. A peripheral gap 35 between the separator 10 and the frame 14 forms a trough 34. The peripheral gap 35 is in fluid communication with the vent 26. The peripheral gap 35 is in fluid communication with one or more troughs 34 formed in the separator 10. The peripheral gap 35 is also free of active material 60.

FIG. 3 illustrates an electrode plate 12. The electrode plate 12 includes a substrate 56. The substrate 56 includes a frame 14 about its periphery. The frame 14 projects from the substrate 56. The frame is integral with the substrate 56. The frame 14 includes a trough 34. The trough 34 is formed in an inward facing surface 15 of the frame. The trough 34 is formed as a depression, such as a groove. The trough 34 extends along the lengths of the inward facing surface 15. The trough 34 surrounds a separator 10 (not shown) when located within the frame 14. The trough 34 may be in fluid communication with one or more troughs 34 formed in a separator (such as shown in FIGS. 1 and 2), one or more vents 26, one or more openings 20, one or more transverse channels 30 (not shown), or a combination thereof. The substrate 56 includes inserts 22 projecting therefrom. The inserts 22 are integral with the substrate 56. The inserts 22 include openings 20. The openings 20 of the inserts 22 pass through both the insert 22 and the substrate 56.

Figures 4, 5:
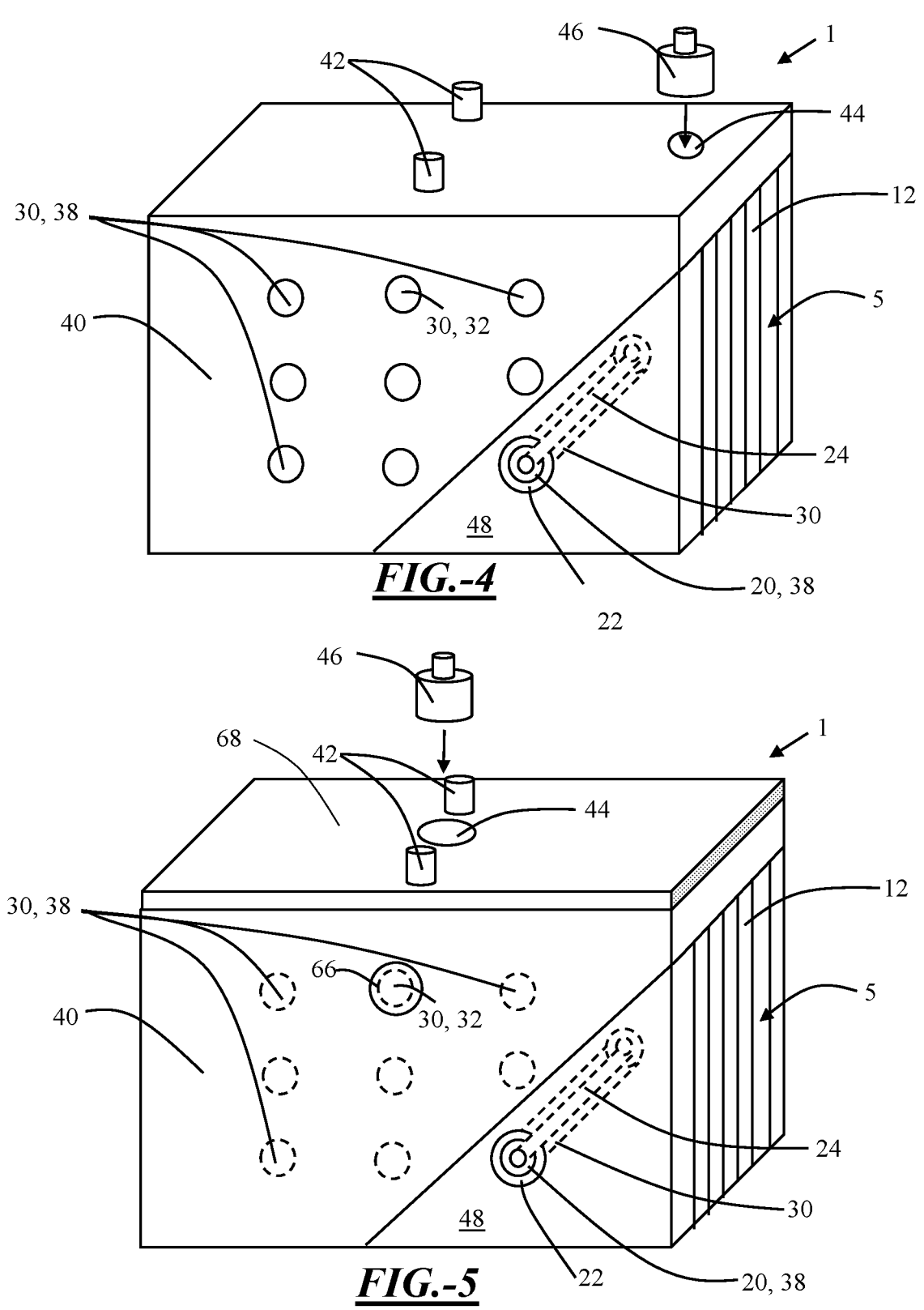
FIG. 4 illustrates a partially cutaway view of a battery assembly.
FIG. 5 illustrates a partially cutaway view of a battery assembly.

FIGS. 4 and 5 illustrate a partially cutaway view of a battery assembly 1. The battery assembly 1 includes a stack 5 of electrode plates 12 with separators 10 (not visible) located therebetween. Located about the stack 5 of electrode plates 12 and separators 10 is an outer seal 40. The outer seal 40 is shown as partially cutaway or transparent. The battery assembly 1 includes a pair of conductive terminals 42. The battery assembly 1 includes a vent hole 44 in communication with a valve 46. The valve 46 may be a check valve, fill valve, pressure release valve, pressure valve, or other valve. The vent hole 44 and valve 46 may be aligned (FIG. 5) or off-aligned (FIG. 4) with one or more transverse channels 30. The valve 46 may be in fluid communication with a headspace 68 (such as shown in FIG. 5). It is also possible that a valve 46 may be located at one or more openings 20 at the end of one or more transverse channels 30. The end of one or more open transverse channels 30 may be one or more ports 66. The battery assembly 1 includes a plurality of transverse channels 30. One or more transverse channels 30 may be synonymous with one or more channels passing transversely through the plurality of electrode plates 12 and separators 10. Some of the transverse channels 30 are support channels 38. At least one of the transverse channels 30 is a fill channel 32. The fill channel 32 may include a port 66 on one or more ends, such as illustrated in FIG. 5. The port 66 may be a fill and/or evacuation port. The fill channel 32 may be in fluid communication with the vent hole 44. The vent hole 44 may be aligned with one or more transverse channels 30, such as the fill channel 32. In the exposed portion of the battery assembly 1, one of the electrode plates 12 is shown. The electrode plate 12 located at the end of the stack of the electrode plates 12 is a monopolar plate 48. The monopolar plate 48 includes an opening 20. The opening 20 includes an insert 22 about its periphery. The opening 20 is aligned with a plurality of other openings 20 to form a transverse channel 30, specifically a support channel 38. Located within the support channel 38 is a post 24. The post 24 extends transversely along the length of the transverse channel 30.

FIG. 6 shows a partially exploded stack 5 of electrode plates 12 which form a battery assembly 1. The battery assembly 1 may be recognized as a bipolar battery assembly. Shown are opposing end plates 50 (e.g., first and second end plates). The end plates 50 are also monopolar plates 48. The end plate 50 includes an internal reinforcement structure 52. The end plate 50 includes a plurality of openings 20. Each opening 20 is partially surrounded by an insert 22. The insert 22 projects from a base 64 of the end plate 50. The base 64 is also the substrate 56 of the monopolar plate 48. Located about the substrate 56 is a frame 14. Adjacent to the monopolar plate 48 is a separator 10. The separator 10 is in the form of one or more sheets 16. The separator 10 includes a plurality of openings 20. The openings 20 of the separator 10 allow for the inserts 22 of the electrode plates 12 to pass therethrough. Adjacent to the separator 10 is a bipolar plate 54. The bipolar plate 54 includes a substrate 56. The substrate 56 of the bipolar plate 54 includes a frame 14 about its periphery. The frame 14 forms a raised edge about the periphery of the substrate 56. The bipolar plate 54 includes a plurality of openings 20. Each opening 20 is partially surrounded by an insert 22. The insert 22 projects from the substrate 56 of the bipolar plate 54. The inserts 22 of the electrode plates 12 (monopolar plates 48 and bipolar plates 54) and the openings 20 of the electrode plates 12 align and interlock to form one or more transverse channels 30 through the stack 5 of electrode plates 12. One or more of the transverse channels 30 may receive one or more posts 24 (not shown) therethrough. One or more troughs 34 may be part of the stack 5. For example, one or more troughs 34 as illustrated in any of FIGS. 1-3 may be incorporated into battery assembly 1. The battery assembly 1 may include one or more active materials 60 (not shown) and/or one or more transfer sheets 62 (not shown), such as illustrated in FIG. 2.

Figure 7:
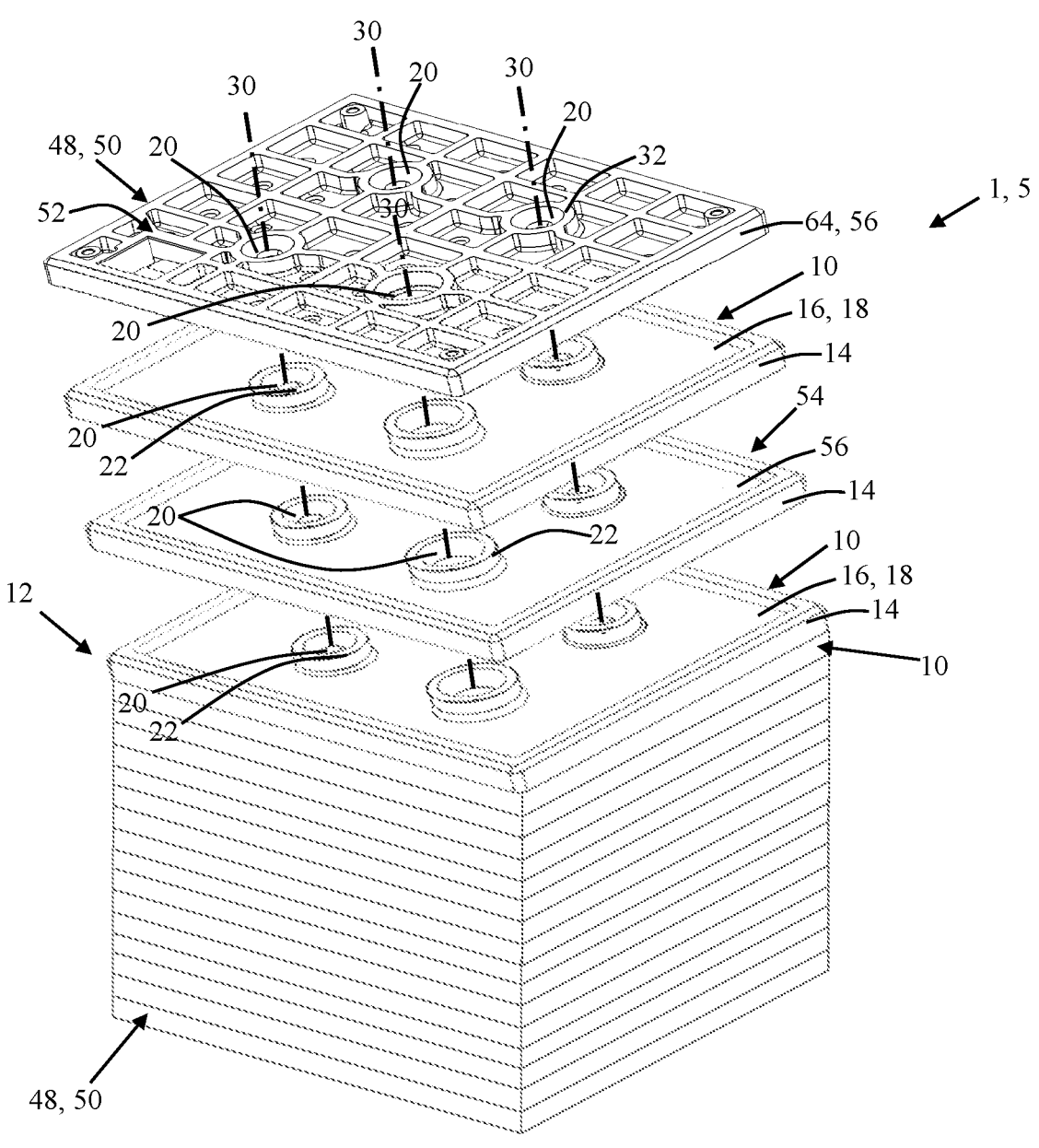
FIG. 7 illustrates a partially exploded stack of electrode plates and separators of a battery assembly.

FIG. 7 shows a partially exploded stack 5 of electrode plates 12 which form a battery assembly 1. The electrode plates 12 include opposing monopolar plates 48 at the ends of the stack and bipolar plates 54 therebetween. The electrode plates 12 are alternatingly arranged with separators 10, such that a separator 10 is located between each pair of electrode plates 12. Shown is an end plate 50 which is a monopolar plate 48. The end plate 50 includes an internal reinforcement structure 52. The monopolar plate 48 includes a plurality of openings 20. Each opening 20 is surrounded by an insert 22. The insert 22 is raised and projecting from a base 64 of the monopolar plate 48. The base 64 is also the substrate 56 of the monopolar plate 48. Adjacent to the monopolar plate 48 is a separator 10. The separator 10 includes a frame 14. The frame 14 forms a raised edge about the periphery of the separator 10. The separator 10 includes a sheet 16. The sheet 16 may be a glass mat, such as an absorbent glass mat (AGM) 18. The sheet 16 is located in the interior and adjacent to the frame 14. The sheet 16 may be integral with the frame 14 or affixed thereto. The separator 10 includes a plurality of openings 20. Each opening 20 is at least partially surrounded by an insert 22. The insert 22 projects from the separator 10, such as from the sheet 16. Adjacent to the separator 10 is a bipolar plate 54. The bipolar plate 54 includes a substrate 56 and a frame 14. The frame 14 forms a raised edge about the periphery of the substrate 56 of the bipolar plate 54. The bipolar plate 54 includes a plurality of openings 20. Each opening 20 is at least partially surrounded by an insert 22. The insert 22 projects from the substrate 56 of the bipolar plate 54. The inserts 22 and channel openings 20 align and the inserts 22 interlock to form one or more transverse channels 30 through the stack of electrode plates 12. One or more of the transverse channels 30 can receive one or more posts 24 (not shown) therethrough, such that one or more posts 24 (not shown) extend through one or more of the transverse channels 30. The battery assembly 1 may include one or more active materials 60 (not shown) and/or one or more transfer sheets 62 (not shown), such as illustrated in FIG. 4. The battery assembly 1 may include one or more troughs 34 (not shown), such as illustrated in FIGS. 1-3.

Figure 8:
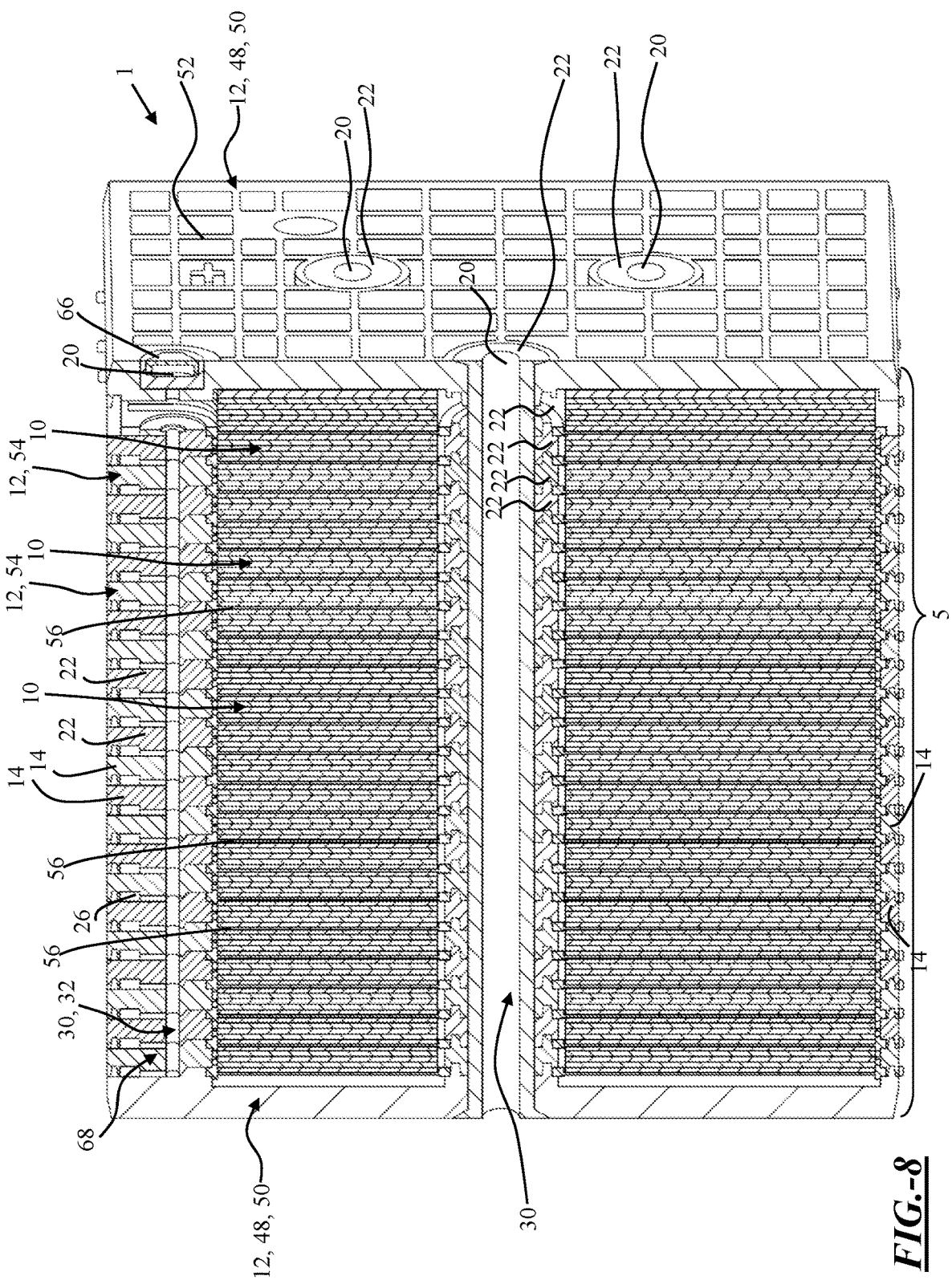
FIG. 8 is a perspective view of a cross-section through one or more channels of a battery assembly.

FIG. 8 illustrates a perspective view of a cross-section of a battery assembly 1. The cross-section is taken through a plurality of transverse channels 30. The battery assembly 1 includes opposing monopolar plates 48 as end plates 50. The monopolar plate 48 includes an internal reinforcement structure 52. The battery assembly 1 includes a stack 5 of a plurality of electrode plates 12 alternating with separators 10. The electrode plates 12 include the opposing monopolar plates 48 and a plurality of bipolar plates 54 therebetween. The electrode plates 12 includes inserts 22. The inserts 22 are aligned and interlock with one another. Some inserts 22 may be formed as part of or in close proximity to a frame 14. The inserts 22 include openings 20 therethrough. The openings 20 are aligned to form the transverse channels 30. The transverse channels 30 extend transversely through the battery assembly 1. The transverse channels 30 extend through the electrode plates 12, the separators 10, the active material 60, and the electrolyte 70 (not shown) located between pairs of electrode plates 12. One or more of the transverse channels 30 may have one or more posts 24 (not shown) extending therethrough. One or more of the transverse channels 30 is a fill channel 32. The fill channel 32 may be in fluid communication with a headspace 68. The headspace 68 may be an area outside of an active region having one or more vents 26, vent holes 44, valves 46, ports 68, or a combination thereof. The headspace 68 may be an area which receives a liquid electrolyte or other fluids (not shown). The electrode plates 12 and separators 14 include respective frames 14. The frames 14 are aligned and interlock with one another about the periphery of the battery assembly 1. Sone insert 22 including vent holes 44.

Figure 9:
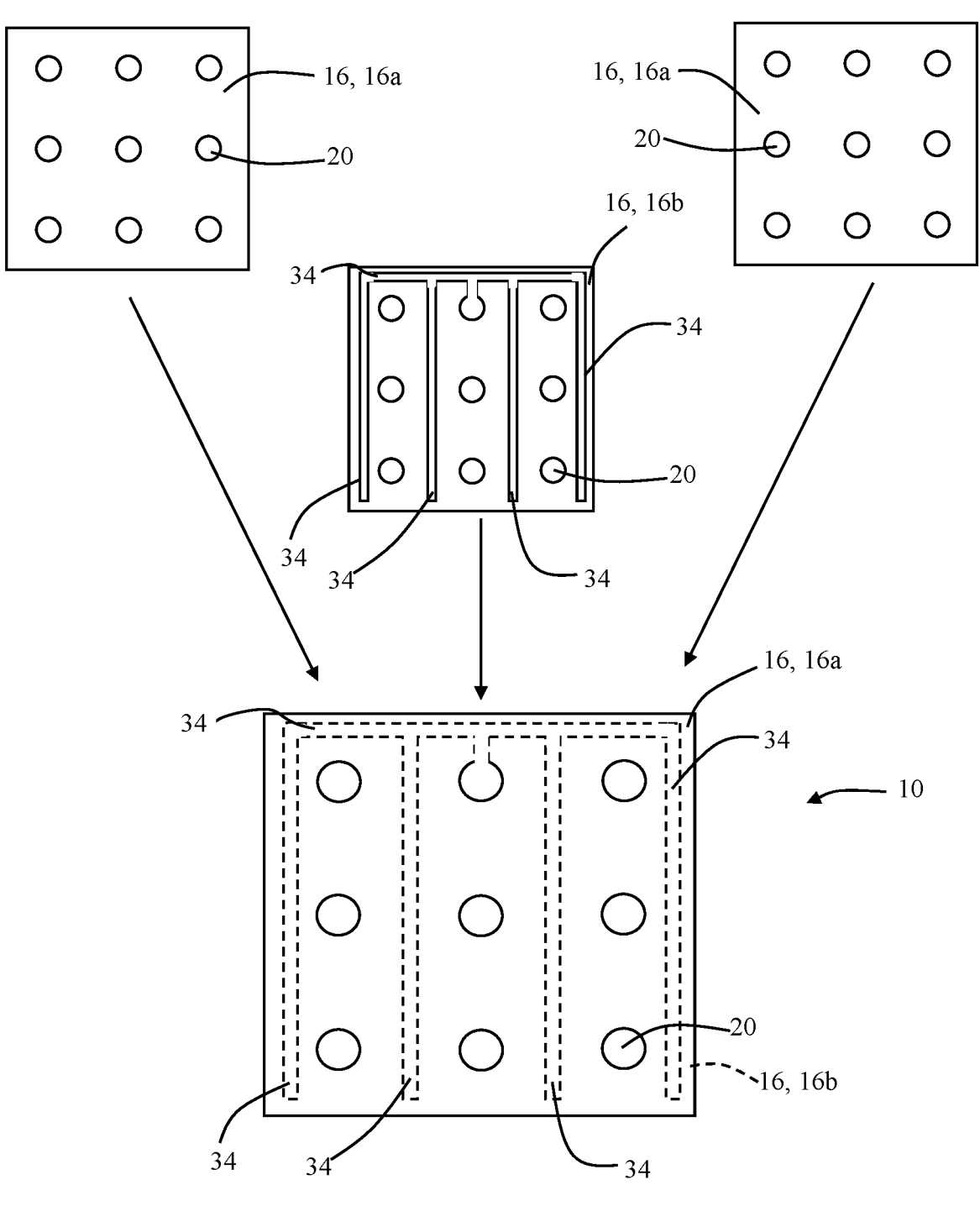
FIG. 9 illustrates a separator formed by a stack of sheets and having a plurality of troughs.

FIG. 9 illustrates the assembly of a separator 10 with a plurality of sheets 16. Some of the sheets 16 are outer sheets 16a while another is an inner sheet 16b. The inner sheet 16b may be a single sheet or a plurality of sheets. The sheets 16 may have or be free of openings 20 formed therein before stacking into a separator 10. The openings 20 align when stacked as a plurality of sheets 16 which form the separator 10. The inner sheet 16b includes a plurality of troughs 34. The plurality of sheets 16 are stacked such that the outer sheets 16a have one or more inner sheets 16b located therebetween. The stack of sheets 16 forms the separator 10. The plurality of troughs 34 formed in the inner sheet 16b are enclosed by the outer sheets 16a.

Figures 10, 11:
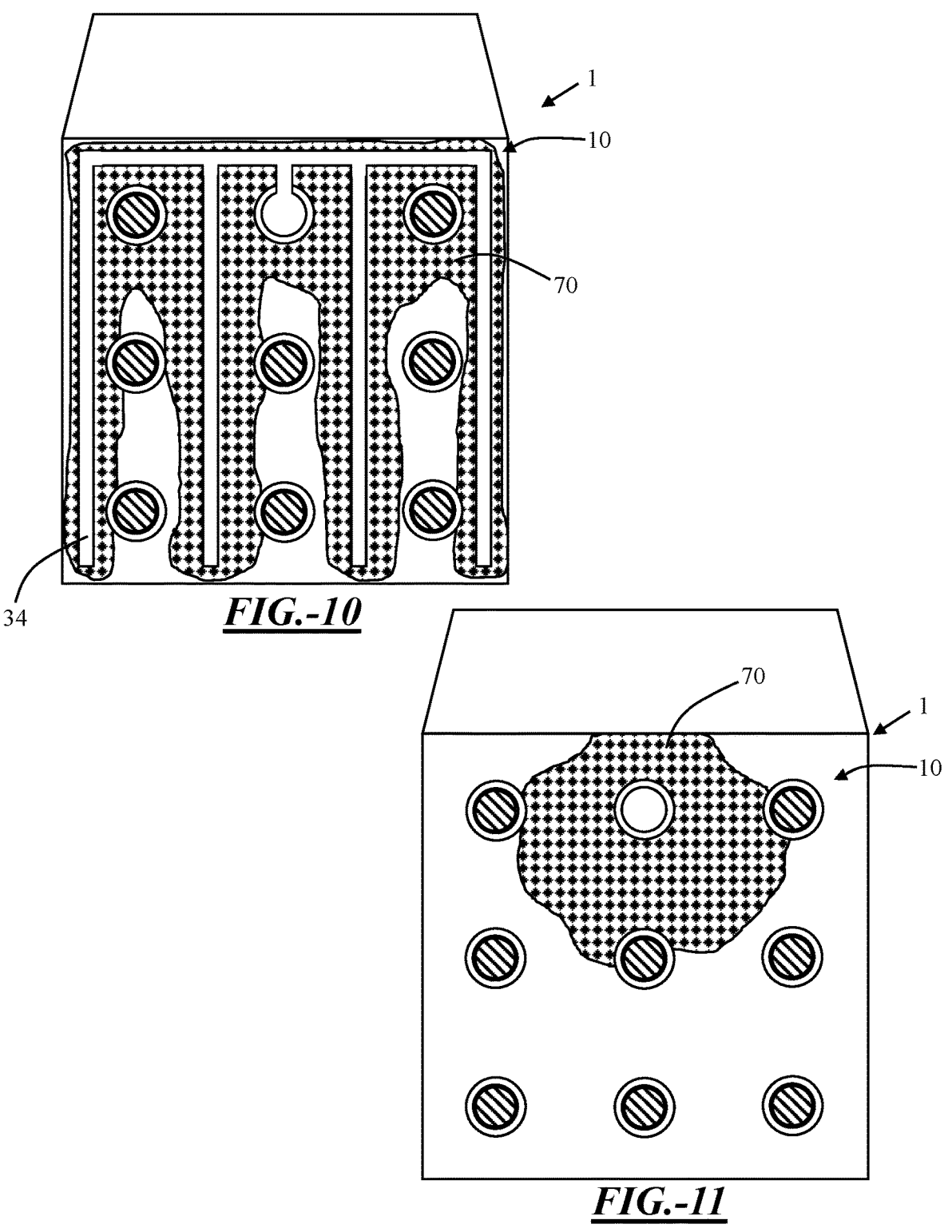

FIGS. 10 and 11 each illustrate a cross-section of a battery assembly 1. The cross-section of the battery assembly 1 is taken as to expose a separator 10. The separator of FIG. 10 includes the troughs 34, such as illustrated in FIG. 1. The separator of FIG. 11 does not include the troughs 34. Both FIGS. 10 and 11 illustrate an electrolyte 70 being absorbed into the separator 10.

FIG. 12 illustrates a graph showing the duration it takes to fill a battery assembly 1 (not shown) with electrolyte 70 (not shown). The graph illustrates the filling of a battery assembly 1 with the troughs A versus without the troughs B, such as illustrated in FIGS. 10 and 11 respectively.

Figure 13:
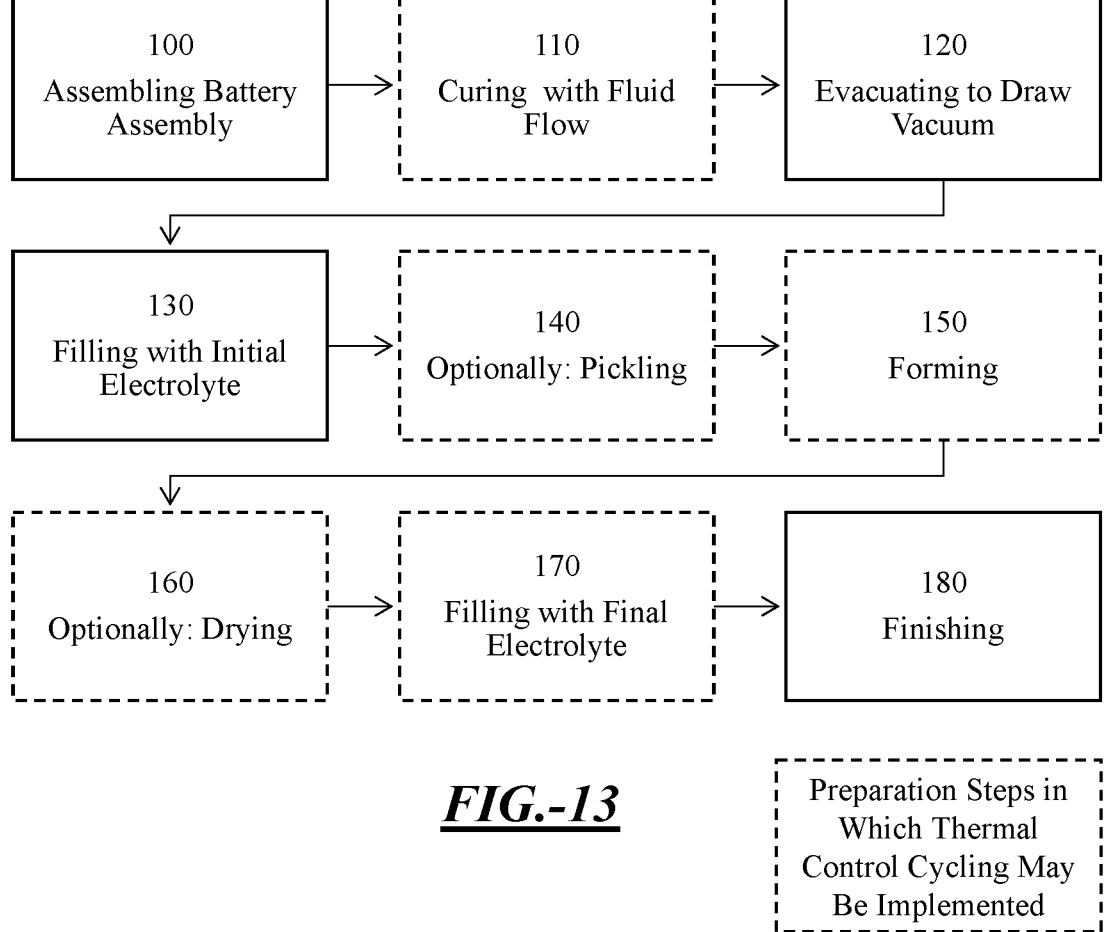
FIG. 13 illustrates a flow diagram of a method for preparing a battery assembly.

FIG. 13 illustrates a flow diagram for a method for preparing a battery assembly. The method may begin with assembling 100 a battery assembly. Upon assembly, the method may include curing 110. Curing may be completed via circulating one or more fluids through the battery assembly. The fluid circulation may be referred to or work similar to thermal control cycling as described herein. Curing may be completed via humid and/or dry air being circulated through the battery assembly. The one or more fluids during curing may flow through one or more troughs, such as shown in FIGS. 1-3, and one or more channels, such as shown in FIGS. 6-8. After curing, the assembly may be evacuated 120. Evacuating may include drawing a vacuum. Either simultaneous with or after evacuation, the battery assembly may be filled with an initial electrolyte 130. Optionally, pickling 140 may commence. It is possible to be free of a pickling step and instead move to formation 150. During pickling and/or formation, one or more fluids may be circulated through the battery assembly. The fluid circulation may be referred to as thermal control cycling as described herein. For example, the fluid(s) may include one or more electrolytes. After forming 160, the battery assembly may optionally be dried 160. Drying may take advantage of one or more fluids flowing through the battery assembly. The fluid circulation during drying may be referred to or work similar to thermal control cycling as described herein. Either after forming 150 or drying 160, the battery assembly may be filled with a final electrolyte 170. After filling, the assembly may then be finished 180. Thermal control cycling may be useful during one or more steps during this method. Thermal control cycling may refer to the evacuation of one fluid and filling of the same or another fluid. Thermal control cycling may include filling of a fluid at a same or different temperature as the evacuated fluid. Thermal control cycling may include repeatedly evacuating and filling a battery assembly with one or more fluids. Steps indicated with broken lines may find particular use with thermal control cycling.

COMPARATIVE EXAMPLE

FIGS. 10-12 illustrate how the addition of troughs 34 can significantly expedite the flow of electrolyte 70 throughout a battery assembly 1. The graph illustrates how the troughs 34 allow for the battery assembly 1 to be 90% filled with electrolyte in about 1 minute as compared to a battery assembly without troughs, which is 90% filled in about 14 minutes. To achieve 100% filled with electrolyte, the troughs provide for a 14 minutes and 26 seconds fill time while without the troughs provides for an approximate 46-minute fill time.

Any numerical values recited in the above application include all values from the lower value to the upper value in increments of one unit provided that there is a separation of at least 2 units between any lower value and any higher value. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints.

The terms "generally" or "substantially" to describe angular measurements may mean about +/−10° or less, about +/−5° or less, or even about +/−1° or less. The terms "generally" or "substantially" to describe angular measurements may mean about +/−0.01° or greater, about +/−0.1° or greater, or even about +/−0.5° or greater. The terms "generally" or "substantially" to describe linear measurements, percentages, or ratios may mean about +/−10% or less, about +/−5% or less, or even about +/−1% or less. The terms "generally" or "substantially" to describe linear measurements, percentages, or ratios may mean about +/−0.01% or greater, about +/−0.1% or greater, or even about +/−0.5% or greater.

The term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of the elements, ingredients, components, or steps.

Plural elements, ingredients, components, or steps can be provided by a single integrated element, ingredient, component, or step. Alternatively, a single integrated element, ingredient, component, or step might be divided into separate plural elements, ingredients, components, or steps. The disclosure of "a" or "one" to describe an element, ingredient, component, or step is not intended to foreclose additional elements, ingredients, components, or steps.

What is claimed is:

1. A method for preparing a battery assembly comprising:
   a) a providing of a formed battery stack with a plurality of electrochemical cells which form the battery assembly, wherein the formed battery stack includes:
      i) a plurality of electrode plates which are stacked, each having a substrate with one or more active materials thereon in paste form;
      ii) one or more channels passing transversely through the plurality of electrode plates which are stacked, including passing through the substrate and the one or more active materials; and
      iii) one or more troughs formed within one or more of the plurality of electrochemical cells and in fluid communication with at least one of the one or more channels, wherein the one or more troughs are substantially perpendicular to the one or more channels;
   b) a pickling of the battery assembly while flowing one or more pickling fluids through the battery assembly;
      wherein the pickling includes circulating the one or more pickling fluids through one or more electrochemical cells of the plurality of electrochemical cells and allowing the one or more pickling fluids to soak into the one or more active materials,
   c) a forming of the battery assembly by applying an electric charge while flowing one or more forming fluids through the battery assembly; and
   d) a filling of the battery assembly with one or more final fluids before operation of the battery assembly; and
      wherein the one or more final fluids has a higher specific gravity than the one or more pickling fluids and the one or more forming fluids.

2. The method of claim 1, wherein the one or more pickling fluids, the one or more forming fluids, or both are a liquid electrolyte which includes one or more reactants; and
   wherein the concentration of the one or more reactants in the one or more pickling fluids and the one or more forming fluids is lower than the concentration of the one or more reactants in the one or more final fluids.

3. The method of claim 1, wherein the method includes a curing, a drying, or both the curing and the drying of the one or more active materials located on one or more substrates of one or more of the plurality of electrode plates; and
   wherein the curing includes hardening the one or more active materials;
   wherein the drying includes removing one or more fluids from the battery assembly; and
   wherein the one or more fluids includes the one or more pickling fluids, the one or more forming fluids, the one or more final fluids, or a combination thereof.

4. The method of claim 3, wherein the curing, the drying, or both the curing and the drying involves flowing the one or more fluids through the one or more channels, the one or more troughs, or both.

5. The method of claim 4, wherein the method includes the curing, and for the curing, the one or more fluids include a humid air.

6. The method of claim 3, wherein the drying occurs after the curing, after the forming, or after both the curing and the forming.

7. The method of claim 4, wherein the method includes the drying, and for the drying, the one or more fluids involve a dry air, one or more drying fluids, or both.

8. The method of claim 2, wherein the liquid electrolyte include a chilled electrolyte which is chilled to a temperature below an ambient temperature; and
   wherein the chilled electrolyte is chilled to the temperature of about 0° C. or greater to about 20° C. or less.

9. The method of claim 2, wherein the one or more pickling fluids include one or more diluted liquid electrolytes.

10. The method of claim 1, wherein the one or more forming fluids include one or more liquid electrolytes; and
    wherein the one or more liquid electrolytes include a chilled electrolyte, a heated electrolyte, or both the chilled electrolyte and the heated electrolyte.

11. The method of claim 10, wherein the one or more forming fluids include one or more diluted liquid electrolytes.

12. The method of claim 1, wherein the one or more final fluids for the filling of the plurality of electrochemical cells of the formed battery stack includes a liquid electrolyte flowed into the battery assembly via the one or more channels, the one or more troughs, or both.

13. The method of claim 12, wherein the method includes evacuating the one or more pickling fluids, the one or more forming fluids, or both from the formed battery stack prior to or simultaneously filling with the one or more final fluids which includes the liquid electrolyte.

14. The method of claim 13, wherein after the filling, one or more ports of the battery assembly are permanently and/or temporarily sealed; and
    wherein the method includes adding one or more valves, terminals, covers, membranes, straps, labels, or a combination thereof.

15. The method of claim 6, wherein the method is free of using a curing oven for the curing of the one or more active materials, free of using a drying oven for the drying of the one or more active materials, or free of both the curing oven and the drying oven.

16. The method of claim 12, wherein the method is free of using a fill and formation tank during the pickling, the forming, the filling, or a combination thereof.

17. The method of claim 1, wherein the method includes assembling the battery assembly prior to the providing of the formed battery stack.

18. The method of claim 1, wherein the formed battery stack includes one or more separators comprising:

a) one or more sheets which are porous and non-conductive, and configured to allow electrolyte, ions, electrons, or a combination thereof therethrough;

b) one or more openings in each of the one or more sheets are aligned with one or more other openings of adjacent electrode plates of the plurality of electrode plates, wherein the one or more other openings of the plurality of electrode plates form the one or more channels; and c) the one or more troughs are formed in the one or more sheets as one or more other channels of reduced thickness of the one or more sheets and adapted to guide flow of an electrolyte of the battery assembly;

wherein the one or more troughs include a plurality of troughs and the plurality of troughs include a main trough and one or more branching troughs;

wherein the main trough is in direct fluid communication with the one or more openings; and wherein the one or more branching troughs are distanced from the one or more openings and in fluid communication with the main trough.

19. The method of claim 1, wherein the specific gravity of the one or more final fluids is 1.05 to 1.4, and the specific gravity of the one or more pickling fluids and the one or more forming fluids is 1.05 to 1.15.

20. A method for preparing a battery assembly comprising:

a) a providing of a formed battery stack with a plurality of electrochemical cells which form the battery assembly, wherein the formed battery stack includes:

i) a plurality of electrode plates which are stacked, each having a substrate with one or more active materials thereon in paste form, and having one or more openings formed in the substrate;

ii) one or more channels passing transversely through the plurality of electrode plates which are stacked, including passing through the substrate and the one or more active materials, wherein the one or more channels are formed by alignment of the one or more openings;

iii) one or more separators, wherein the one or more separators include:

iii-a) one or more sheets which are porous and non-conductive, and configured to allow electrolyte, ions, electrons, or a combination thereof therethrough;

iii-b) one or more other openings in the one or more sheets aligned with the one or more openings of adjacent electrode plates of the plurality of electrode plates; and iii-c) one or more troughs formed in the one or more sheets such as to be within one or more electrochemical cells of the plurality of electrochemical cells;

wherein the one or more troughs are formed as one or more other channels of reduced thickness of the one or more sheets and configured to guide flow of the electrolyte of the battery assembly;

wherein the one or more troughs are in fluid communication with at least one of the one or more channels;

wherein the one or more troughs are substantially perpendicular to the one or more channels;

wherein the one or more troughs include a plurality of troughs and the plurality of troughs include a main trough and one or more branching troughs;

wherein the main trough is in direct fluid communication with the one or more other openings;

the one or more branching troughs are distanced from the one or more other openings and in fluid communication with the main trough; and wherein the one or more branching troughs substantially follow the perimeter of the one or more sheets;

b) a pickling of the battery assembly while flowing one or more pickling fluids through the battery assembly;

wherein the pickling includes circulating the one or more pickling fluids through one or more electrochemical cells and allowing the one or more pickling fluids to soak into the one or more active materials;

c) a forming of the battery assembly by applying an electric charge while flowing one or more forming fluids through the battery assembly; and d) a filling of the battery assembly with one or more final fluids before operation of the battery assembly.

* * * * *